US009084209B2

(12) United States Patent
Gaal et al.

(10) Patent No.: US 9,084,209 B2
(45) Date of Patent: Jul. 14, 2015

(54) CARRIER GROUPING FOR POWER HEADROOM REPORT

(75) Inventors: Peter Gaal, San Diego, CA (US);
Valentin Alexandru Gheorghiu, Tokyo (JP); Sai Yiu Duncan Ho, San Diego, CA (US); Jelena M. Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 819 days.

(21) Appl. No.: 13/291,756

(22) Filed: Nov. 8, 2011

(65) Prior Publication Data
US 2012/0115537 A1 May 10, 2012

Related U.S. Application Data

(60) Provisional application No. 61/411,910, filed on Nov. 9, 2010.

(51) Int. Cl.
*H04W 52/04* (2009.01)
*H04W 52/36* (2009.01)
*H04W 52/14* (2009.01)
*H04W 52/34* (2009.01)

(52) U.S. Cl.
CPC .......... *H04W 52/365* (2013.01); *H04W 52/146* (2013.01); *H04W 52/34* (2013.01)

(58) Field of Classification Search
None
See application file for complete search history.

(56) References Cited

U.S. PATENT DOCUMENTS

| 2011/0081936 A1 | 4/2011 | Haim et al. |
| 2011/0105173 A1 | 5/2011 | Haim et al. |

FOREIGN PATENT DOCUMENTS

| EP | 1912345 | 4/2008 |
| JP | H09200106 A | 7/1997 |
| JP | 2008252312 A | 10/2008 |
| JP | 2010226720 A | 10/2010 |
| JP | 2012510785 A | 5/2012 |
| WO | 2010065759 | 6/2010 |
| WO | 2011019653 A1 | 2/2011 |

OTHER PUBLICATIONS

International Search Report and Written Opinion—PCT/US2011/060027—ISA/EPO—Mar. 27, 2012.

(Continued)

*Primary Examiner* — Philip Sobutka
(74) *Attorney, Agent, or Firm* — Novak Druce Connolly Bove + Quigg LLP

(57) ABSTRACT

Methods, systems, devices, and computer program products are disclosed which facilitate the transmission and reception of power headroom reports for component carriers in a multi carrier wireless communication system. A mobile device may determine available power headroom in a multicarrier configuration through a calculation of a maximum transmit power associated with a first component carrier (CC) in a subset of the CCs. The calculation can account for increases in transmit power of other component carriers in the subset by proportionally increasing transmit powers for each of the subset of CCs. A power headroom may be identified for one or more of the CCs based on a result of the calculation, and a power headroom report (PHR) may be generated that includes the power headroom available for the first CC.

73 Claims, 12 Drawing Sheets

(56) References Cited

OTHER PUBLICATIONS

New Postcom: "Group triggering and reporting of PHR for carrier aggregation", 3GPP Draft; R2-103666 Group Triggering and Reporting of PHR for Carrier Aggregation, 3rd Generation Partnershi P Project (3GPP), Mobile Competence Centre; 650, Route Des Lucioles; F-06921 Sophia-Anti Polis Cedex; France, vol. RAN WG2, No. Stockholm, Sweden; 20100628, Jun. 19, 2010, XP050450930, [retrieved on Jun. 19, 2010] the whole document.
Partial International Search Report—PCT/US2011/060027—ISA/EPO—Feb. 6, 2012.
Qualcomm Incorporated: "Details on UL power control in carrier aggregation setting", 3GPP Draft; R1-101480 UL Power Control for MC, 3rd Generation Partnership Project (3GPP), Mobile Competence Centre; 650, Route Des Lucioles; F-06921 Sophia-Anti Polis Cedex; France, vol. RAN WG1, No. San Francisco, USA; 20100222, Feb. 16, 2010, XP050418934 [retrieved on Feb. 16, 2010] the whole document.
Qualcomm Incorporated: "PA Headroom Report for Rel. 10", 3GPP Draft; R4-103290, 3rd Generation Partnersh I P Project (3GPP), Mobile Competence Centre; 650, Route Des Lucioles; F-06921 Sophia-Antipolis Cedex; France, vol. RAN WG4, No. Madrid, Spain; 20100823, Aug. 19, 2010, XP050454341, [retrieved on Aug. 19, 2010] p. 2, paragraph 2.2.
Research In Motion et al: "Uplink Power Control for Carrier Aggregation", 3GPP Draft; R1-094118 (RIM-UP Power Control for CA), 3rd Generation Partnership Project (3GPP), Mobile Competence Centre; 650, Route Des Lucioles ; F-06921 Sophia-Antipolis Cedex ; France, No. Miyazaki; 20091012, Oct. 12, 2009, XP050388589, [retrieved on Oct. 6, 2009] the whole document.
ZTE: "Parallel transmission of two types PHR", 3GPP Draft; R2-103725 Parallel Transmission of TYPE12 PHR, 3rd Generation Partnership Project (3GPP), Mobile Competence Centre ; 650, Route Des Lucioles ; F-06921 Sophia-Anti Polis Cedex; France, vol. RAN WG2, No. Stockholm, Sweden; 20100628, Jun. 22, 2010, XP050451200, [retrieved on Jun. 22, 2010] the whole document.
LS Response to R1-092984 on UE Power Amplifier configurations for multiple transmit antennas in LTE-A, 3GPP TSG RAN WG4 #52; R4-093422; Shenzhen, CN, Aug. 24-28, 2009, TSG RAN WG4.
LS on Power Amplifier configurations for UEs with multiple transmit antennas in LTE-A, 3gPP TSG-WG1 #57bis, R1-092984, Los Angeles, USA, Jun. 29-Jul. 3, RAN1.
European Search Report—EP13171443—Search Authority—The Hague—Jul. 26, 2013.
European Search Report—EP13171444—Search Authority—The Hague—Jul. 24, 2013.
LS on the reference format on virtual PHR, 3GPP TSG-RAN WG1 #62bis, R1-105820, Xi'an, China, Oct. 11-15, 2010, 1 pg.
LS response on per-UE PHR, 3GPP TSG-RAN WG1 #62bis, R1-105796, Xi'an China, Oct. 11-15, 2010, 1 pg.
Way forward on PHR, TSG-RAN WG1 Meeting #62bis, R1-105761, Xian, China, Oct. 11-15, 2010, 2 pgs.
Details on PHR, 3GPP TSG RAN WG1 #62bis, R1-105561, Xian, China, Oct. 11-15, 2010, 2 pgs.

CARRIER GROUPING FOR POWER HEADROOM REPORT

CROSS REFERENCE(S)

The present application for patent claims priority to U.S. Provisional Patent Application No. 61/411,910 entitled "CARRIER GROUPING FOR POWER HEADROOM REPORT" filed Nov. 9, 2010, assigned to the assignee hereof, and expressly incorporated herein by reference.

BACKGROUND

The following relates generally to wireless communications, and more specifically to power headroom reporting in a multi component carrier communication system. Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output (SISO), multiple-input single-output (MISO) or a multiple-input multiple-output (MIMO) system. To reduce interference and improve efficiency, terminals may be power controlled by base stations subject to a maximum power limit.

SUMMARY

The following generally relates to systems, methods, devices, and computer program products for power headroom reporting in multi component carrier wireless communication systems. Further scope of the applicability will become apparent from the following detailed description, claims, and drawings. The detailed description and specific examples are given by way of illustration only, since various changes and modifications within the spirit and scope of the description will become apparent to those skilled in the art.

In one example, novel functionality is described for transmitting a PHR from a mobile device. The mobile device may identify a maximum transmit power associated with each of a number of independently power controlled component carriers. The identified maximum transmit power of each component carrier may be determined based on an identified maximum transmit power of one or more other component carriers. The identified transmit powers may be used to determine the power headroom available for one or more of the component carriers for the mobile device. The mobile device may transmit a power headroom report to a base station.

In one example, a method of wireless communication in a multicarrier system is provided. The method includes determining a set of uplink component carriers to be transmitted concurrently by a mobile device, calculating a maximum transmit power associated with a first component carrier in the set, the calculation accounting for increases in transmit power of each component carrier in at least a first subset of the uplink component carriers that includes the first component carrier by proportionally increasing transmit powers for each of the first subset of component carriers, identifying power headroom available for the first component carrier based on a result of calculating the maximum transmit power, generating a first type of power headroom report (PHR) comprising the power headroom available for the first component carrier, and transmitting a PHR communication including the first type of PHR. Proportionally increasing transmit powers may include, for example, increasing transmit powers for each of the first subset of component carriers by substantially equal amounts as measured in dB. Each of the first subset of uplink component carriers, in an example, are to be transmitted concurrently via a same power amplifier.

The method may also include calculating a second maximum transmit power associated with a second component carrier of a second subset of the uplink component carriers, the calculation accounting for the power headroom available on the second uplink component carrier independently of other concurrently transmitted uplink component carriers, identifying power headroom available for the second component carrier based on a result of calculating the second maximum transmit power, generating a second type of power headroom report (PHR) comprising the power headroom available for the second component carrier, and transmitting the PHR communication including the second type of PHR.

A signal may be transmitted to indicate which of the first type and second type of PHR is included in the PHR communication, and/or to indicate the PHR communication is based on calculated maximum transmit power for only the first component carrier. In some examples, each of the first subset of uplink component carriers are transmitted in a first frequency band, and the second uplink component carrier is transmitted in a second frequency band that is different than the first frequency band, and a power amplifier that transmits each uplink component carrier may be determined based on the frequency band of the uplink component carrier. The second subset of component carriers may include a single uplink component carrier, and the first subset of component carriers may include two uplink component carriers. In an example, the first subset of component carriers includes the first component carrier and a third component carrier, and the PHR communication includes available power headroom corresponding to the third component carrier that is based on the calculated maximum transmit power for the first component carrier.

In one example, each component carrier in the first subset of component carriers is transmitted concurrently via a first power amplifier, and at least a second component carrier is transmitted concurrently from the mobile device via a second power amplifier. In such a case, the method may also include calculating a second maximum transmit power associated with the second component carrier, the calculation accounting for the power headroom available on the second component carrier independently of other uplink component carriers; and generating a second type of PHR based on the second calculated maximum transmit power, and wherein transmitting the PHR communication comprises transmitting the second type of PHR. The first subset of component carriers may include the first component carrier and a third component carrier, and the maximum transmit power for the third component carrier may be determined based on the calculated maximum transmit power for the first component carrier. In one example, the method also includes transmitting a signal to indicate the first type of PHR is based on the calculated maximum transmit power for only the first component carrier and that the second type of PHR is based on the second calculated maximum transmit power. The first type of PHR may be based on the calculated maximum transmit power for each component carrier of the first subset, and the second type of PHR may be based on the second calculated maximum transmit power.

In another example, an apparatus for reporting power headroom in a multicarrier wireless communication is provided. The apparatus includes a power headroom calculation module configured to calculate a maximum transmit power associated with a first component carrier in a set of concurrently transmitted uplink component carriers, the calculation accounting for increases in transmit power of each component carrier in at least a first subset of the uplink component carriers that includes the first component carrier by proportionally increasing transmit powers for each of the first subset of uplink component carriers, and to identify a power headroom available for the first component carrier based on the calculated the maximum transmit power. Proportionally increasing transmit powers may include, for example, increasing transmit powers for each of the first subset of component carriers by substantially equal amounts as measured in dB. The apparatus includes a power headroom reporting module configured to generate a first type of power headroom report (PHR) comprising the power headroom available for the first component carrier, and a transmitter module configured to transmit a PHR communication including the first type of PHR. The transmitter module may include two or more power amplifiers, with each of the subset of uplink component carriers to be transmitted concurrently via a same power amplifier. The power headroom calculation module may also be configured to calculate a second maximum transmit power associated with a second component carrier of a second subset of the uplink component carriers, the calculation accounting for the power headroom available on the second uplink component carrier independently of other concurrently transmitted uplink component carriers, and to identify power headroom available for the second component carrier based on a result of calculating the second maximum transmit power. The power headroom reporting module may be further configured to generate a second type of power headroom report (PHR) comprising the power headroom available for the second component carrier, and the transmitter may be further configured to transmit the PHR communication including the second type of PHR. Each of the first subset of uplink component carriers, in an example, are transmitted in a first frequency band, and the second uplink component carrier is transmitted in a second frequency band that is different than the first frequency band. A power amplifier that transmits each uplink component carrier may be determined based on the frequency band of the uplink component carrier.

In another example, a computer program product for reporting power headroom from a mobile device is provided. The computer program product may include a tangible computer-readable medium comprising code for determining a set of uplink component carriers to be transmitted concurrently by the mobile device, code for calculating a maximum transmit power associated with a first component carrier in the set, the calculation accounting for increases in transmit power of each component carrier in at least a first subset of the uplink component carriers that includes the first component carrier by proportionally increasing transmit powers for each of the first subset of uplink component carriers, code for identifying power headroom available for the first component carrier based on a result of calculating the maximum transmit power, code for generating a first type of power headroom report (PHR) comprising the power headroom available for the first component carrier, and code for transmitting a PHR communication including the first type of PHR. Proportionally increasing transmit powers may include, for example, increasing transmit powers for each of the first subset of component carriers by substantially equal amounts as measured in dB.

The computer-readable medium also includes, in an example, code for calculating a second maximum transmit power associated with a second component carrier of a second subset of the uplink component carriers, the calculation accounting for the power headroom available on the second uplink component carrier independently of other concurrently transmitted uplink component carriers, code for identifying power headroom available for the second component carrier based on a result of calculating the second maximum transmit power, code for generating a second type of power headroom report (PHR) comprising the power headroom available for the second component carrier; and code for transmitting the PHR communication including the second type of PHR. The computer-readable medium may further include code for transmitting a signal to indicate which of the first type and second type of PHR is included in the PHR communication. Each of the first subset of uplink component carriers, in an example, transmitted in a first frequency band, and the second uplink component carrier is transmitted in a second frequency band that is different than the first frequency band. The computer-readable medium may further include code for transmitting a signal to indicate the PHR communication is based on calculated maximum transmit power for only the first component carrier.

A mobile device for reporting power headroom in a multicarrier wireless communication system is provided in another example. The mobile device includes means for determining a set of uplink component carriers to be transmitted concurrently, means for calculating a maximum transmit power associated with a first component carrier in the set, the calculation accounting for increases in transmit power of each component carrier in at least a first subset of the uplink component carriers that includes the first component carrier by proportionally increasing transmit powers for each of the first subset of uplink component carriers, means for identifying power headroom available for the first component carrier based on a result of calculating the maximum transmit power, means for generating a first type of power headroom report (PHR) comprising the power headroom available for the first component carrier; and means for transmitting a PHR communication including the first type of PHR. Proportionally increasing transmit powers may include, for example, increasing transmit powers for each of the first subset of component carriers by substantially equal amounts as measured in dB.

The mobile device may also include means for calculating a second maximum transmit power associated with a second component carrier of a second subset of the uplink component carriers, the calculation accounting for the power headroom available on the second uplink component carrier independently of other concurrently transmitted uplink component carriers, means for identifying power headroom available for the second component carrier based on a result of calculating the second maximum transmit power, means for generating a second type of power headroom report (PHR) comprising the power headroom available for the second component carrier, and means for transmitting the PHR communication including the second type of PHR. Means for transmitting a signal to indicate which of the first type and second type of PHR is included in the PHR communication may also be included in the system. In another example, the mobile device also includes means for transmitting a signal to indicate the PHR communication based on a calculated maximum transmit power for only the first component carrier.

Another example provides a method of wireless communication in a multicarrier system. The method includes identifying power headroom available at a mobile device for each of a plurality of uplink component carriers to be transmitted concurrently from the mobile device, determining that a first type of power headroom report (PHR) is to be generated when one power amplifier is to be used for transmitting two or more of the uplink component carriers, and that a second type of PHR is to be generated when one power amplifier is to be used for transmitting one of the uplink component carriers, calculating a maximum transmit power for one or more of the uplink component carriers based on the one or more types of PHR, generating a PHR communication including one or more of the first and second type of PHR based on the determining, the one or more PHR based on the calculated maximum transmit power, and transmitting the PHR communication. Calculating a maximum transmit power may include calculating, when it is determined that the first type of PHR is to be generated, a maximum transmit power associated with at least one of the two or more uplink component carriers, the calculation accounting for the power headroom available at each of the two or more uplink component carriers by proportionally increasing transmit powers for each component carrier by a substantially equal amount. Calculating a maximum transmit power may also include calculating, when it is determined that the second type of PHR is to be generated, a maximum transmit power associated with the one uplink component carrier, the calculation accounting for the power headroom available at the one uplink component carrier independently of any increase in transmit power of other of the uplink component carriers.

The method may also include transmitting a signal to indicate which of the first type and second type of PHR is transmitted. Each of the two or more uplink component carriers, in an example, is transmitted in a first frequency band, and the one uplink component carrier is transmitted in a second frequency band that is different than the first frequency band. The power amplifier that transmits each uplink component carrier may be determined based on the frequency band of the uplink component carrier. The first type of PHR may include power headroom information for one of the two or more uplink component carriers based on the calculated maximum transmit power for another of the two or more uplink component carriers. A signal may be transmitted to indicate the first type of PHR is based on calculated maximum transmit power for only one of the two or more uplink component carriers when the first maximum transmit power is calculated.

A further example provides a computer program product for reporting power headroom from a mobile device, the computer program product comprising a tangible computer-readable medium that includes code for identifying power headroom available at the mobile device for each of a plurality of uplink component carriers to be transmitted concurrently from the mobile device, code for determining that a first type of power headroom report (PHR) is to be generated when one power amplifier is to be used for transmitting two or more of the uplink component carriers, and that a second type of PHR is to be generated when one power amplifier is to be used for transmitting one of the uplink component carriers, code for calculating a maximum transmit power for one or more of the uplink component carriers based on the one or more types of PHR, code for generating a PHR communication including one or more of the first and second type of PHR based on the determining, the one or more PHR based on the calculated maximum transmit power, and code for transmitting the PHR communication. The code for calculating a maximum transmit power may include code for calculating, when it is determined that the first type of PHR is to be generated, a maximum transmit power associated with at least one of the two or more uplink component carriers, the calculation accounting for the power headroom available at each of the two or more uplink component carriers by proportionally increasing transmit powers for each component carrier by a substantially equal amount. The code for calculating a maximum transmit power also may include code for calculating, when it is determined that the second type of PHR is to be generated, a maximum transmit power associated with the one uplink component carrier, the calculation accounting for the power headroom available at the one uplink component carrier independently of any increase in transmit power of other of the uplink component carriers.

In another example, a mobile device is provided. The mobile device includes means for identifying power headroom available for each of a plurality of uplink component carriers to be transmitted concurrently from the mobile device, means for determining that a first type of power headroom report (PHR) is to be generated when one power amplifier is to be used for transmitting two or more of the uplink component carriers, and that a second type of PHR is to be generated when one power amplifier is to be used for transmitting one of the uplink component carriers, means for calculating a maximum transmit power for one or more of the uplink component carriers based on the one or more types of PHR, means for generating a PHR communication including one or more of the first and second type of PHR based on the determining, the one or more PHR based on the calculated maximum transmit power, and means for transmitting the PHR communication. The means for calculating a maximum transmit power may include means for calculating, when it is determined that the first type of PHR is to be generated, a maximum transmit power associated with at least one of the two or more uplink component carriers, the calculation accounting for the power headroom available at each of the two or more uplink component carriers by proportionally increasing transmit powers for each component carrier by a substantially equal amount. The means for calculating a maximum transmit power, in another example, includes means for calculating, when it is determined that the second type of PHR is to be generated, a maximum transmit power associated with the one uplink component carrier, the calculation accounting for the power headroom available at the one uplink component carrier independently of any increase in transmit power of other of the uplink component carriers.

The mobile device may also include means for transmitting a signal to indicate which of the first type and second type of PHR is transmitted. Each of the two or more uplink component carriers are transmitted, in an example, in a first frequency band, and the one uplink component carrier is transmitted in a second frequency band that is different than the first frequency band. The power amplifier that transmits each uplink component carrier may be determined based on the frequency band of the uplink component carrier. The system, in an example, further includes means for transmitting a signal to indicate the first type of PHR is based on calculated maximum transmit power for only one of the two or more uplink component carriers when the first maximum transmit power is calculated.

In yet another example, a wireless communications apparatus is provided that includes a receiver module configured to receive a power headroom report (PHR) communication that comprises one or more of a first type of PHR and a second type of PHR, the first type of PHR comprising first power headroom information that is based on a first maximum transmit power associated with two or more uplink component carriers associated with concurrent transmission using a single power amplifier, and the second type of PHR comprising second power headroom information that is based on a second maximum transmit power associated with a selected one uplink component carrier transmitted through a single power amplifier. The apparatus also includes a power headroom determination module configured to determine which of the one or more of the first type and second type of PHR are included in the PHR communication, and to determine maximum transmit power for one or more to be concurrently transmitted uplink component carriers based on the received PHR communication and the one or more types of PHR included in the PHR communication. The power headroom determination module may be further configured to determine that the PHR communication includes the first type of PHR when the two or more uplink component carriers are in the same frequency band. The power headroom determination module also may be further configured to determine the maximum transmit power for the two or more uplink component carriers when the first maximum transmit power is calculated by proportionally increasing transmit powers for each of the plurality of uplink component carriers. Proportionally increasing transmit powers may include, for example, increasing transmit powers for each of the plurality of uplink component carriers by substantially equal amounts as measured in dB.

In one example, the power headroom determination module is further configured to determine that the PHR communication includes the second type of PHR when the selected one uplink component carrier is in a frequency band that is different than the frequency band of other of the plurality of uplink component carriers. The power headroom determination module may further be configured to determine the maximum transmit power for the selected one uplink component carrier when the second maximum transmit power is calculated independently of any increase in transmit power of other of the uplink component carriers. The first power headroom information may be based on a maximum transmit power for a first of the two or more uplink carriers, and the power headroom determination module may be further configured to determine the maximum transmit power for a second of the two or more uplink component carriers based on a difference between a current transmit power of the first of the two or more uplink carriers and the first power headroom information. The receiver module may be configured to receive a plurality of concurrently transmitted uplink component carriers.

In still a further example, a method for wireless communications in a multi carrier wireless communications system is provided. The method of this example includes receiving a power headroom report (PHR) communication that comprises one or more of a first type of PHR and a second type of PHR, the first type of PHR comprising first power headroom information that is based on a first maximum transmit power associated with two or more uplink component carriers to be concurrently transmitted through a single power amplifier, and the second type of PHR comprising second power headroom information that is based on a second maximum transmit power associated with a selected one uplink component carrier transmitted through a single power amplifier, determining which of the one or more of the first type and second type of PHR are included in the PHR communication, and determining maximum transmit power for one or more to be concurrently transmitted uplink component carriers based on the received PHR communication and the one or more types of PHR included in the PHR communication. The method may further include determining that the PHR communication includes the first type of PHR when the two or more uplink component carriers are in the same frequency band, determining the maximum transmit power for the two or more uplink component carriers by accounting for the first maximum transmit power being calculated by proportionally increasing transmit powers for each of the plurality of uplink component carriers, and/or determining that the PHR communication includes the second type of PHR when the selected one uplink component carrier is in a frequency band that is different than the frequency band of other of the plurality of uplink component carriers. Proportionally increasing transmit powers may include, for example, increasing transmit powers for each of the plurality of uplink component carriers by substantially equal amounts as measured in dB. The first power headroom information may be based on a maximum transmit power for a first of the two or more uplink carriers, and determining the maximum transmit power may include determining the maximum transmit power for a second of the two or more uplink component carriers based on a difference between a current transmit power of the first of the two or more uplink carriers and the first power headroom information.

In another example, a base station in a multi carrier wireless communications system is provided. The base station of this example includes means for receiving a power headroom report (PHR) communication that comprises one or more of a first type of PHR and a second type of PHR, the first type of PHR comprising first power headroom information that is based on a first maximum transmit power associated with two or more uplink component carriers to be concurrently transmitted through a single power amplifier, and the second type of PHR comprising second power headroom information that is based on a second maximum transmit power associated with a selected one uplink component carrier transmitted through a single power amplifier, means for determining which of the one or more of the first type and second type of PHR are included in the PHR communication and means for determining maximum transmit power for one or more to be concurrently transmitted uplink component carriers based on the received PHR communication and the one or more types of PHR included in the PHR communication. The means for determining maximum transmit power may include means for determining the maximum transmit power for the two or more uplink component carriers when the first maximum transmit power is calculated by proportionally increasing transmit powers for each of the plurality of uplink component carriers. Proportionally increasing transmit powers may include, for example, increasing transmit powers for each of the plurality of uplink component carriers by substantially equal amounts as measured in dB. The means for determining which of the one or more of the first type and second type of PHR is included in the PHR communication may include means for determining that the PHR communication includes the second type of PHR when the selected one uplink component carrier is in a frequency band that is different than the frequency band of other of the plurality of uplink component carriers.

A further example provides a computer program product for determining transmit power a multi carrier wireless communications system comprising a tangible computer-readable medium that includes code for receiving a power headroom report (PHR) communication that includes one or more of a first type of PHR and a second type of PHR, the first type of PHR having first power headroom information that is based on a first maximum transmit power associated with two or more uplink component carriers to be concurrently transmitted through a single power amplifier, and the second type of PHR having second power headroom information that is based on a second maximum transmit power associated with a selected one uplink component carrier transmitted through a single power amplifier, code for determining which of the one or more of the first type and second type of PHR are included in the PHR communication, and code for determining maximum transmit power for one or more to be concurrently transmitted uplink component carriers based on the received PHR communication and the one or more types of PHR included in the PHR communication. The computer-readable medium may also include code for determining that the PHR communication includes the first type of PHR when the two or more uplink component carriers are in the same frequency band, and determining that the PHR communication includes the second type of PHR when the selected one uplink component carrier is in a frequency band that is different than the frequency band of other of the plurality of uplink component carriers, and code for determining the maximum transmit power for the two or more uplink component carriers by accounting for the first maximum transmit power being calculated by proportionally increasing transmit powers for each of the plurality of uplink component carriers. Proportionally increasing transmit powers may include, for example, increasing transmit powers for each of the plurality of uplink component carriers by substantially equal amounts as measured in dB.

These and other features of various embodiments, together with the organization and manner of operation thereof, will become apparent from the following detailed description when taken in conjunction with the accompanying drawings, in which like reference numerals are used to refer to like parts throughout.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Various disclosed embodiments are illustrated by way of example, and not of limitation, by referring to the accompanying drawings, in which.

DETAILED DESCRIPTION OF THE INVENTION

Systems, methods, devices, and computer program products are described for power headroom reporting in a multi-carrier system. In some examples, a mobile device determines available power headroom in a multicarrier configuration through a calculation of a maximum transmit power associated with a first component carrier (CC) in a subset of the CCs. The calculation can account for increases in transmit power of other component carrier in the subset by proportionally increasing transmit powers for each of the subset of CCs. Proportionally increasing transmit powers may include, for example, increasing transmit powers for each of the subset of component carriers by substantially equal amounts as measured in dB. A power headroom may be identified for one or more of the CCs based on a result of the calculation, and a power headroom report (PHR) generated that includes the power headroom available for the first CC. In some examples, a mobile device determines which of a first type and second type (or both) of PHR is to be generated based on a configuration of one or more power amplifiers (PAs), with a first type of PHR generated when one PA is to be used for transmitting two or more of the CCs, and a second type of PHR generated when one PA is to be used for transmitting one of the CCs. The mobile device may transmit a PHR to a base station.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
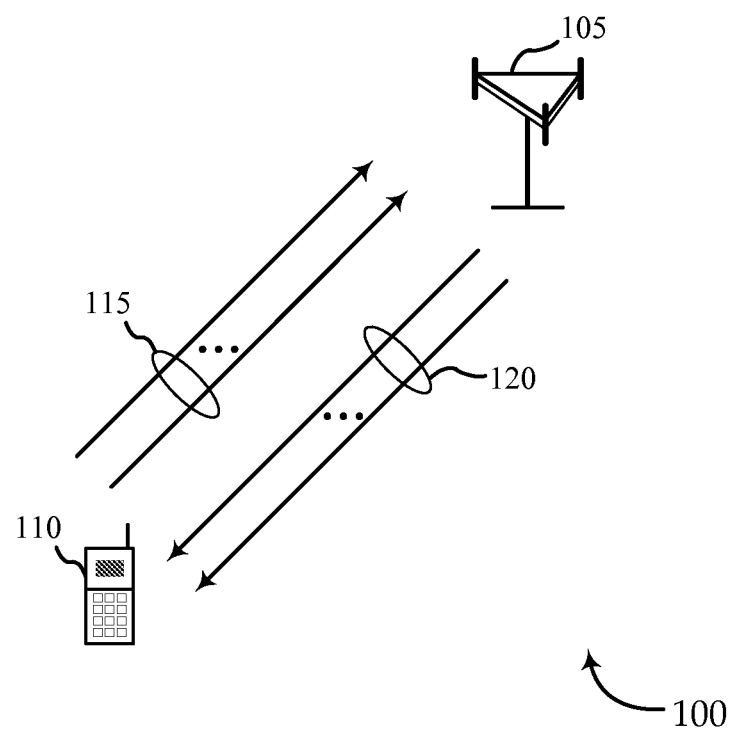
FIG. 1 illustrates a wireless communication system.

Referring first to FIG. 1, a block diagram illustrates an example of a wireless communication system 100 within which the various disclosed examples may be implemented. The system 100 includes a base station 105 and a user equipment 110. Of course, such a system typically includes a number of base stations 105 and user equipment 110, with a single base station 105 and user equipment 110 illustrated in FIG. 1 for purposes of simplifying the discussion of the system. Base station 105 may be a macrocell, femtocell, picocell, and/or similar base station, a mobile base station, or relay node, for example. The system 100 supports operation on multiple component carriers (CCs), each of which include waveform signals of different frequencies. In FIG. 1, multiple uplink CCs 115 carry uplink transmissions from the user equipment 110 to the base station 105. Multiple downlink CCs 120 carry downlink transmissions from the base station 105 to the user equipment 110. The system 100 may be a multi-carrier LTE network capable of efficiently allocating network resources, although aspects of the disclosure may be applicable to any number of other types of systems.

The base station 105 may wirelessly communicate with the user equipment 110 via one or more base station antenna(s). The base station 105 is configured to communicate with the user equipment 110 under the control of a base station controller via the multiple uplink and/or downlink CCs 115 and 120. The base station 105 may be a node B, or an enhanced node B (eNodeB) in an LTE network. The base station 105 may provide communication coverage for a particular geographic area, with other base stations 105 that may provide coverage for different geographic areas. A plurality of user equipments 110 may be dispersed throughout the coverage area. The user equipment 110 may be, for example, a mobile station, mobile device, access terminal (AT), or subscriber unit. Such a user equipment 110 may include a cellular phone and wireless communications device, but may also be a personal digital assistant (PDA), smartphone, other handheld device, netbook, notebook computer, tablet computer, etc.

A user equipment 110 may transmit a power headroom report (PHR) to base station 105. This report may include information identifying a difference between a maximum user equipment transmit power and a calculated user equipment transmit power (e.g., according to a current uplink grant). PHRs can be transmitted periodically, or when the downlink pathloss changes in an amount exceeding a threshold and may relate to a physical uplink control channel (PUCCH), a physical uplink shared channel (PUSCH), or both channels. In response to receiving a PHR, the base station 105 can send up or down commands for either PUCCH or PUSCH.

The user equipment 110 may be configured to identify a transmit power associated with each of a number of independently power controlled uplink CCs. The independently power controlled uplink CCs may relate to transmissions on a plurality of uplink carriers configured for use by the mobile device 110. Furthermore, one or more on the uplink CCs may be transmitted from the user equipment 110 using a single power amplifier (PA), or two or more separate power amplifiers. A power headroom report (PHR) may be transmitted (e.g., in a single protocol data unit (PDU)) over the reverse link 115, and may include the calculated power headroom available for the user equipment 110, taking into account the configuration of the PAs and the impact of PA configuration on available power headroom. For example, as will be described in further detail below, user equipment 110 may be configured to transmit on two CCs (e.g., a first CC and a second CC) using a first PA, and to transmit on a third CC using a second PA. The maximum transmit power of each of the CCs transmitted using the first PA will be impacted by the other CC(s) being concurrently transmitted using the first PA. In one example, a maximum transmit power for a first CC is calculated, and a maximum power for a second CC is calculated by assuming a proportional increase of the transmit power for the second CC equal, or substantially equal, to the ratio between the first CC transmit power and the calculated maximum transmit power for the first CC. In another example, the maximum transmit power for the third CC is calculated independently of the transmit powers of the first and second CCs, due to the third CC being transmitted by the second PA.

In one set of examples, aspects may be used within a long term evolution—advanced (LTE/A) system. LTE/A may utilize orthogonal frequency division multiplexing (OFDM) on the downlink and single-carrier frequency division multiplexing (SC-FDMA) on the uplink. OFDM and SC-FDMA partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDMA. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.4, 3, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10 or 20 MHz, respectively. In some examples, component carriers transmitted within the same frequency band (referred to as intra-band carriers) are transmitted through a single power amplifier in the user equipment 110, and component carriers transmitted in different frequency bands (referred to as inter-band carriers) are transmitted through different power amplifiers in the user equipment 110.

A single PHR may carry information about multiple CCs utilized by user equipment 110. A PHR may be a single PDU, which may contain a power headroom which accounts for transmit power associated with, for example, an actual PUSCH and/or PUCCH transmission. A user equipment 110 may transmit a PHR to the base station 105 when triggered by the base station 105, or periodically. The power headroom value in a PHR may include a single, 6 bit PDU, with a reporting range from −23 dB to 40 dB (and steps of 1 dB). Thus, a single PHR may provide the base station 105 with information on two, or more, CCs, and the base station 105 may decompose the PHR into information about each of the CCs. The base station 105 may use this information to influence future scheduling decisions. For example, the base station 105 may know that ACK/NAK is expected in a particular subframe (e.g., i+4). Given a power headroom reported for subframe (i), and the knowledge that the user equipment 110 will need to allocate more power for ACK/NAK, the base station 105 may change its uplink grants for subframe (i+4) based on information available in the PHR. Thus, power headroom for certain CCs during a first time period may be used to provide a power allocation on one or more of the same, or other, CCs during a second time period.

Figure 2:
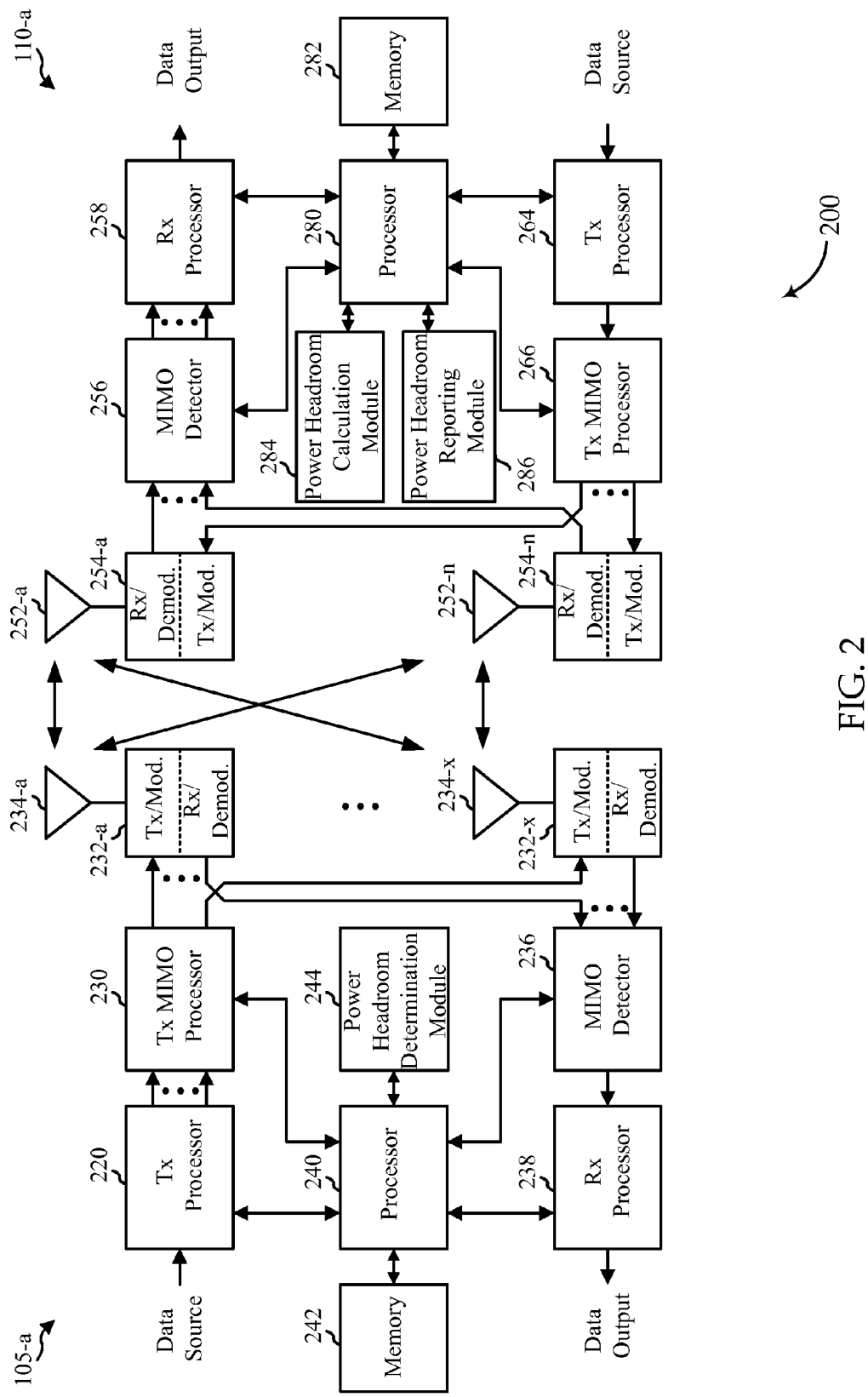
FIG. 2 is a block diagram illustration of a transmitter and receiver in a wireless communications system.

FIG. 2 is a block diagram of a system 200 including a base station 105-a and a user equipment 110-a. This system 200 may be the system 100 of FIG. 1. The base station 105-a may be equipped with antennas 234-a through 234-x, and the user equipment 110-a may be equipped with antennas 252-a through 252-n. At the base station 105-a, a transmit processor 220 may receive data from a data source and control information from a processor 240, memory 242, and/or power headroom determination module 244. The control information may be a grant with power allocations for PUCCH and PUSCH, scheduling transmission on uplink CCs for a particular user equipment 110-a. The control information may also be for the physical control format indicator channel (PCFICH), physical HARQ indicator channel (PHICH), physical downlink control channel (PDCCH), physical downlink shared channel (PDSCH), etc. In one example, the power headroom determination module 244 may determine a type of power headroom report (PHR) that is received from a particular user equipment 110-a. A first type of PHR may include power headroom information that is based on a first maximum transmit power associated with two or more uplink CCs to be concurrently transmitted through a single power amplifier (PA), and a second type of PHR may include power headroom information that is based on a maximum transmit power associated with one CC transmitted through a single PA. The power headroom determination module 244 interprets the different types of PHRs differently, as will be described in more detail below, to determine power headroom available at each of the CCs for the user equipment 110-a.

The transmit processor 220 may process (e.g., encode and symbol map) the data and control information to obtain data symbols and control symbols, respectively. The transmit processor 220 may also generate reference symbols, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the transmit modulators 232-a through 232-x. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232-a through 232-x may be transmitted via the antennas 234-a through 234-x, respectively.

At the user equipment 110-a, the user equipment antennas 252-a through 252-n may receive the downlink signals from the base station 105-a and may provide the received signals to the demodulators 254-a through 254-n, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254-a through 254-n, perform MIMO detection on the received symbols if applicable, and provide detected symbols. A receive processor 258 may process (e.g., demodulate, deinterleave, and decode) the detected symbols, providing decoded data for the user equipment 110-a to a data output, and provide decoded control information to a processor 280, memory 282, power headroom calculation module 284, or power headroom reporting module 286 (e.g., the processing allocation information to identify carriers and timing to be used for PUSCH and PUCCH transmission on the uplink).

On the uplink, at the user equipment 110-a, a transmit processor 264 may receive and process data (e.g., for the PUSCH) from a data source and control information (e.g., for the PUCCH) from the processor 280, power headroom calculation module 284, and power headroom reporting module 286. The transmit processor 264 may also generate reference symbols for a reference signal. The symbols from the transmit processor 264 may be precoded by a TX MIMO processor 266 if applicable, further processed by the demodulators 254-a through 254-n (e.g., for SC-FDMA, etc.), and be transmitted to the base station 105-a. At the base station 105-a, the uplink signals from the user equipment 110-a may be received by the antennas 234, processed by the demodulators 232, detected by a MIMO detector 236 if applicable, and further processed by a receive processor 238 to obtain decoded data and control information sent by the user equipment 110-a. The processor 238 may provide the decoded data to a data output and the decoded control information to the processor 240 and/or power headroom determination module 244.

The power headroom calculation module 284 of user equipment 110-a may identify a transmit power associated with each uplink CC. The identified transmit powers, along with other configuration information of the user equipment 110-a, may be used to calculate the power headroom available for each CC for the user equipment 110-a. The user equipment 110-a may transmit the PHR as control information to the base station 105-a. According to various examples, a user equipment 110-a may operate in a LTE Advanced (LTE-A) system according to Release 10 of the 3GPP specifications, and is allowed to set its total configured maximum output power, referred to as $P_{CMAX}$, and a configured maximum output power on a given serving cell, referred to as $P_{CMAX,c}$. Both of these quantities reflect certain adjustments such as limits imposed by upper layers ($P_{EMAX}$), maximum power reduction (MPR), and additional maximum power reduction (A-MPR) values (requirements of higher order modulation, transmit bandwidth configuration, etc). In one example, a user equipment 110-a may set its configured maximum output power $P_{CMAX,c}$ on serving cell c and its total configured maximum output power $P_{CMAX}$. The maximum power is reached when the user equipment 110-a reaches allowed out-of-band emission limits or an adjacent channel leakage ratio (ACLR) limit.

According to various examples, the user equipment 110-a has a maximum power output set at 23 dBm. In a multi-carrier environment, the user equipment 110-a according to various examples calculates power headroom for each component carrier that takes into account increases in transmit power of each component carrier of the multiple component carriers. Power headroom may be calculated for each CC based on a difference between a current transmit power for the CC and the maximum power output for the user equipment 110-a. When a user equipment 110-a is configured to concurrently transmit multiple on CCs, it may be desirable to account for transmit powers of other of the CCs when calculating power headroom for a CC of interest. In some examples, increases in transmit power of each CC may be taken into account by proportionally increasing transmit powers for each of the CCs. Proportionally increasing transmit powers may also include, for example, increasing transmit powers for each of the CCs by substantially equal amounts as measured in dB. Proportionally increasing transmit powers may also include, for example, increasing transmit powers for each of the CCs while maintaining substantially the same ratio of transmit powers between the CCs. In some examples, the user equipment 110-a calculates a maximum transmit power CCs which depends upon a configuration of power amplifiers (PAs) used to transmit the different component carriers. For example, a user equipment 110-a may be configured with multiple CCs transmitted through a single PA, with maximum transmit powers calculated for each CC that take other CCs into account by proportionally increasing transmit powers for other CCs (e.g., increases in substantially equal amounts in dB). In another example, a user equipment 110-a may have one CC that is transmitted through a particular PA, with a maximum transmit power for the one CC calculated independently of any other CCs that are transmitted through other PAs.

Figure 3A:
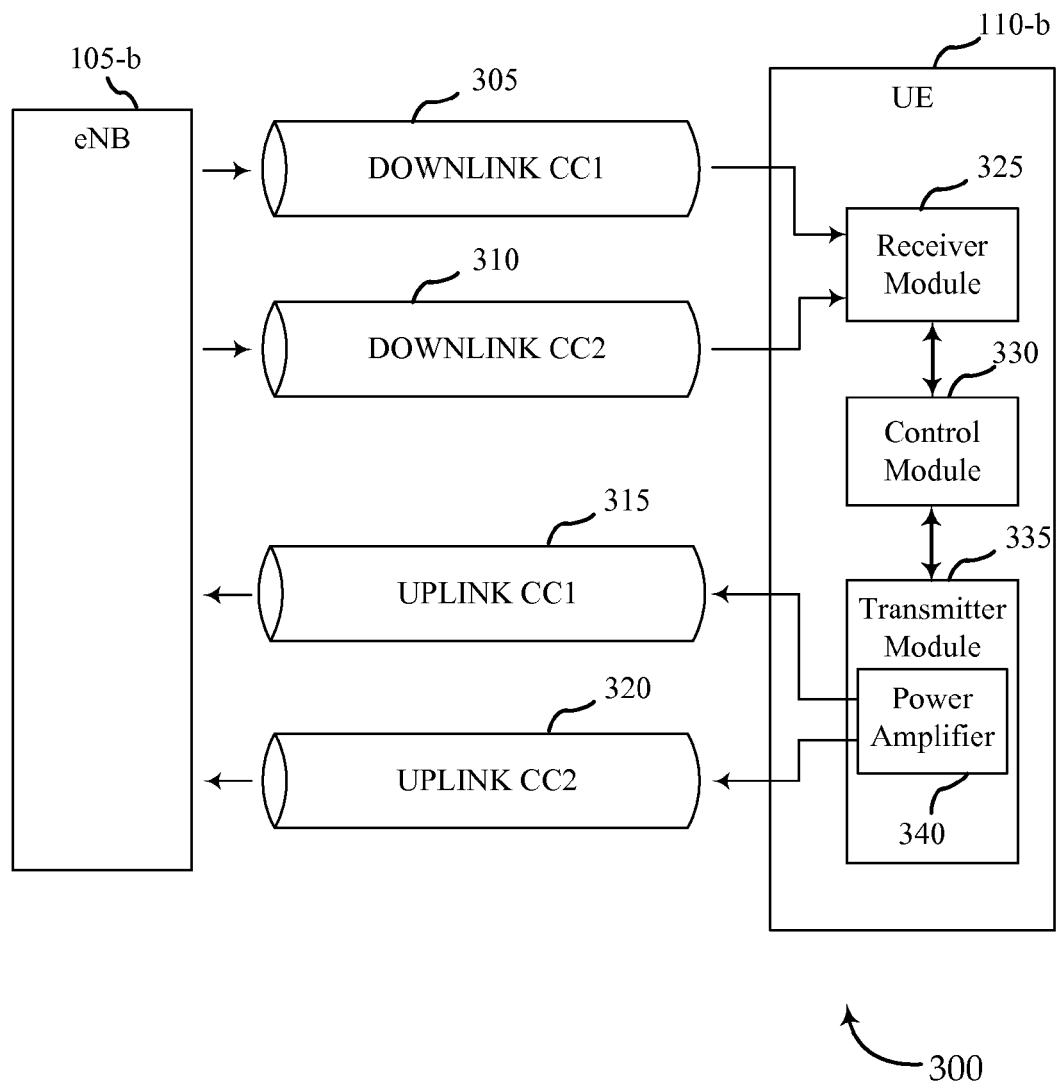
FIG. 3A is a block diagram of a wireless communication system for communicating over multiple component carriers (CCs)

In one example, illustrated in FIG. 3A, a system 300 may include a user equipment 110-b, which may communicate with an enhanced Node B (eNB) 105-b (e.g., a base station, access point, etc.). While only one user equipment 110-b and one eNB 105-b are illustrated in FIG. 3A, it is to be appreciated that the system 300 can include any number of user equipment 110-b and/or eNBs 105-b. The user equipment 110-b may be configured with multiple component carriers utilized by the eNodeB 105-b to enable a wider overall transmission bandwidth. As illustrated in FIG. 3A, the user equipment 110-b may be configured with multiple downlink component carriers 305 and 310, and multiple uplink component carriers 315 and 320. The number of component carriers 305 through 320 configured for the user equipment 110-b at any given point in time may vary. While FIG. 3A depicts two uplink and two downlink component carriers, it is to be appreciated that the user equipment 110-b may be configured with any suitable number of component carriers and, accordingly, the subject matter disclosed herein and claimed is not limited to the illustrated number component carriers. User equipment 110-b and eNB 105-b may be configured to operate using time division duplex (TDD) or frequency division duplex (FDD) communications. When configured to operate using TDD, the downlink CCs and the corresponding uplink CCs (e.g., downlink CC1 305 and uplink CC1 315) may share the same communications channel frequency, while FDD operation utilize different communications channel carrier frequencies.

The user equipment 110-b includes a receiver module 325, a control module 330, and a transmitter module 335. The receiver module 325 can receive downlink transmissions over two or more downlink CCs 305 through 310. Downlink transmissions and information contained therein are received and processed at the control module 330. Control module 330 may contain power headroom calculation and power headroom reporting modules, as described in further detail below. The transmitter module 335 may transmit to eNB 105-b (and/or other eNBs) over the two or more uplink CCs 315 through 320. In the example of FIG. 3A, transmitter module 335 includes a power amplifier (PA) 340 that may be used to transmit multiple uplink CCs 315 through 320. In one example, user equipment 110-b calculates a maximum transmit power for uplink CC1 315 and uplink CC2 320 taking each CC into account by proportionally increasing transmit powers for each of the CCs such as, for example, by increasing transmit powers for each of the CCs by substantially equal amounts (in dB).

For example, assume uplink CC1 315 and uplink CC2 320 are configured with a current transmit power for uplink CC1 315 of 20 dBm and a current transmit power for uplink CC2 310 of 10 dBm. Further assume, for the present example, that MPR is 0 dB and A-MPR is also 0 dB. When determining $P_{CMAX}$ for uplink CC2 320, a proportionally equal amount of power increase in uplink CC1 315 is taken into account. Because it was assumed MPR is 0 dB and A-MPR is 0 dB the power in uplink CC1 315 could be increased by approximately 3 dB, namely the difference between $P_{CMAX,C}$ and the current transmit power for uplink CC1 315. In this example, the maximum transmit power for uplink CC2 320 is calculated to be proportionally increased by the same amount (in dB) as the increase of uplink CC1 315, thus resulting in a calculated maximum transmit power of 13 dBm for uplink CC2 320.

In another example, an assumption is made that user equipment 110-b cannot increase its power on any carrier beyond 23 dBm, and it cannot increase its combined power beyond 23 dBm either. In the above example, the maximum power on uplink CC1 315 is 23 dBm, and the maximum power on uplink CC2 320 is 13 dBm, resulting in a combined total of 23.4 dBm. In one example, if the user equipment 110-b were instructed to transmit uplink CC1 315 and uplink CC2 320 at the calculated maximum power, the actual power that the user equipment 110-b would transmit would be 22.6 dBm on uplink CC1 315 and 12.6 dBm on uplink CC2 320, so as not to exceed a total power of 23 dBm. In one example, the user equipment 110-b provides maximum transmit powers for each CC that proportionally increase transmit powers for each CC by the same amount (in dB), and also factors in the maximum power allowed for the user equipment 110-b, and proportionally reduces the calculated maximum powers such that a sum of the powers does not exceed the allowed maximum power. Continuing with the above example, the user equipment 110-b in such a case would calculate a maximum transmit power for uplink CC1 315 as 22.6 dBm, and the maximum transmit power for uplink CC2 320 as 12.6 dBm, thus complying with the maximum total power of 23 dBm.

Figure 3B:
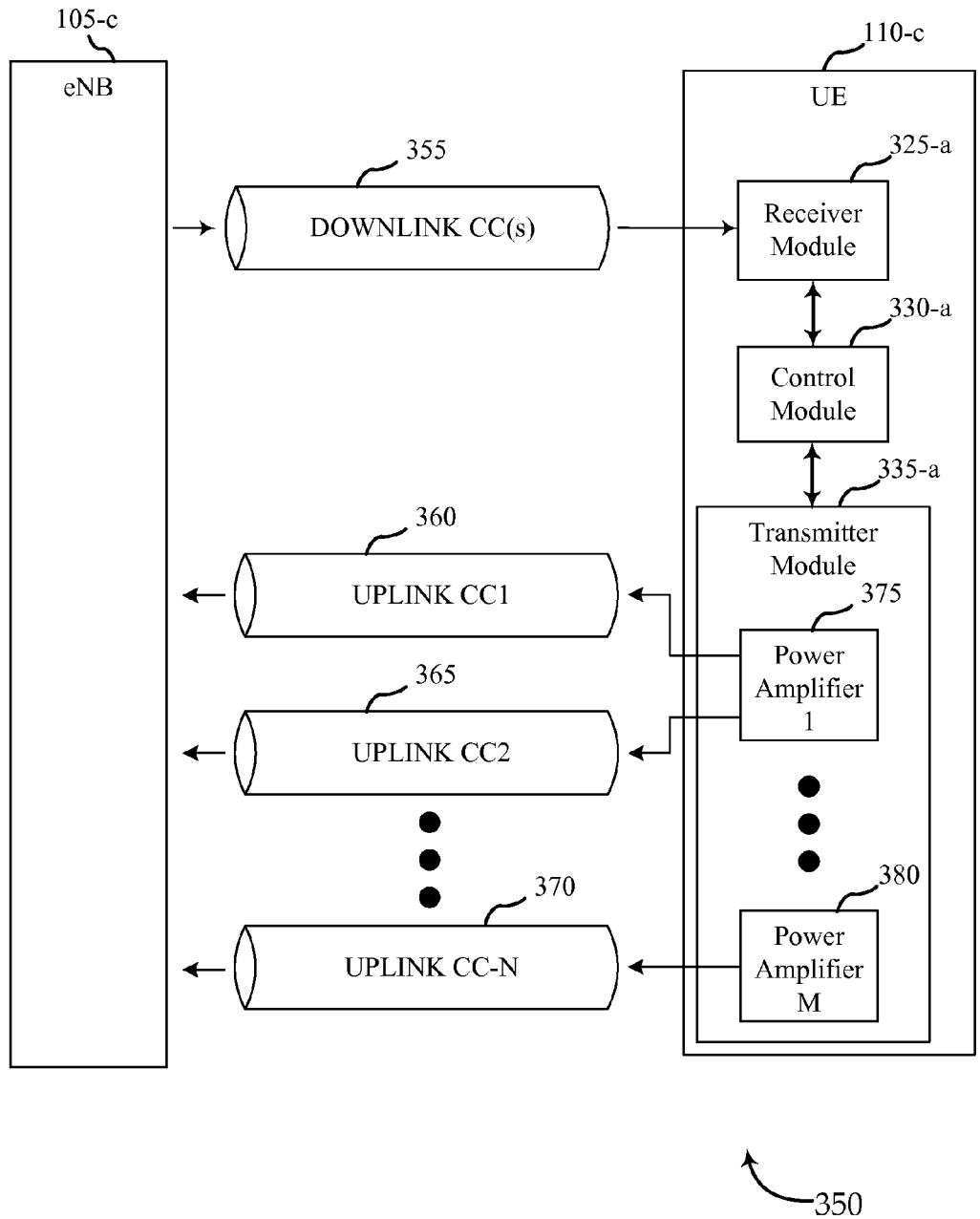
FIG. 3B is a block diagram of another wireless communication system for communicating over multiple CCs.

More than one PA may be used for uplink transmissions, such as the example illustrated in the system of FIG. 3B. In this example, a system 350 may include a user equipment 110-c, which may communicate with an enhanced Node B (eNB) 105-c (e.g., a base station, access point, etc.). System 350 may operate in a similar manner as discussed with respect to system 300 of FIG. 3A, and it is to be appreciated that the system 350 may include any number of user equipment 110-c and/or eNBs 105-c. The user equipment 110-c of FIG. 3B may be configured downlink CC(s) 355, and multiple uplink CCs 360 though and 370. The number of downlink CC(s) 355 and uplink CC(s) 360 through 370, at any given point in time depends upon resource allocations to the particular user equipment 110-c. In the example of FIG. 3B, the transmitter module 335-a of user equipment 110-c includes multiple PAs, including power amplifier 1 375 through power amplifier M 380. In some examples, a single PA, such as power amplifier 375, is used to transmit component carriers that are within the same frequency band (referred to as intra-band CCs), with different PAs used to transmit CCs that are in different frequency bands (referred at inter-band CCs).

Figure 4:
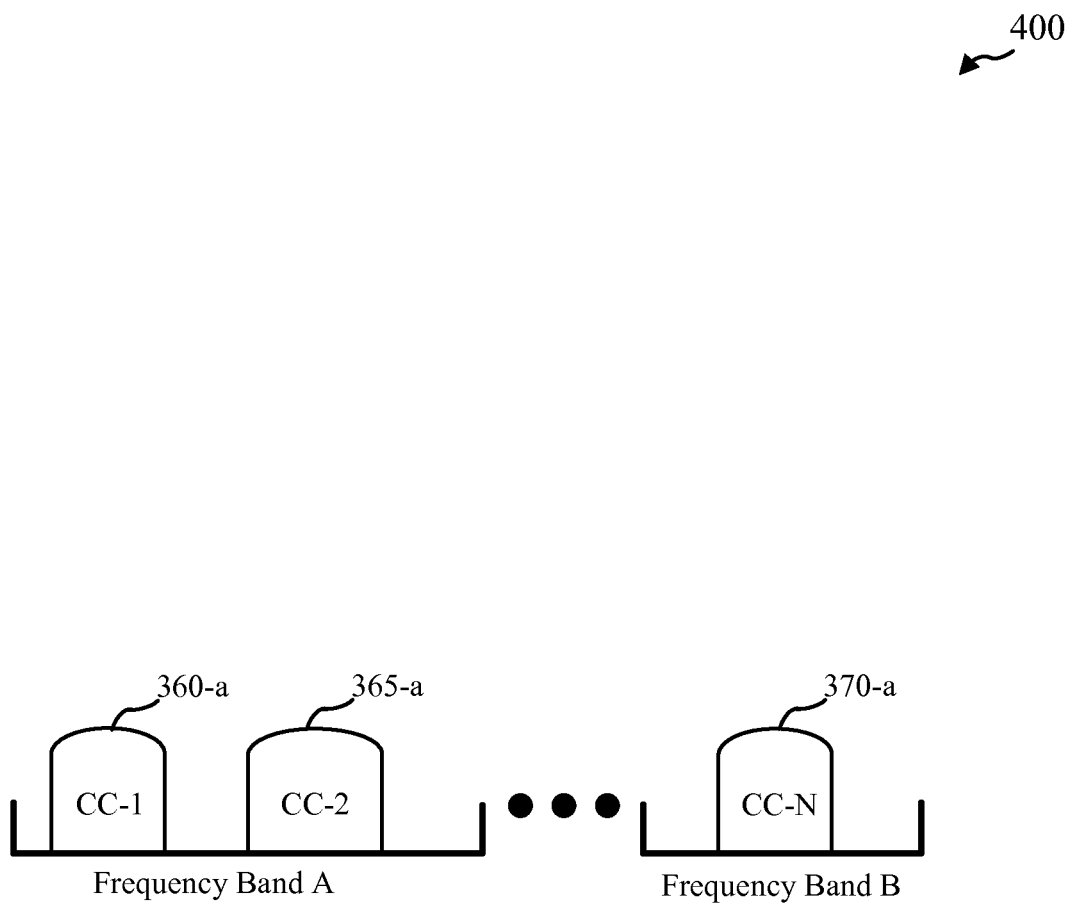
FIG. 4 is an illustration of multiple CCs and frequency bands for the CCs.

An example of intra-band and inter-band component carriers is illustrated in FIG. 4. In this example, a system 400 includes two carrier frequency bands, frequency band A and frequency band B. A number of component carriers may be transmitted using the different frequency bands, such as uplink CC1 360-a and uplink CC2 365-a, which are intra-band CCs, both being within frequency band A. A third component carrier, uplink CC-N 370-a is an inter-band CC, being within frequency band B. In the example of FIG. 3B, the uplink CCs 360 and 370 may be transmitted through power amplifier 375, while uplink CC-N 370 is transmitted through power amplifier M 380. It will be understood that the illustrations of FIGS. 3A, 3B, and 4 are exemplary and that numerous different configurations, with different numbers of PAs and CCs may be used based on particular equipment and operating conditions. In one example, user equipment 110-c calculates a maximum transmit power for uplink CC1 360 and uplink CC2 365 taking each CC into account by proportionally increasing transmit powers for each of the CCs, similarly as discussed above, and calculates a maximum transmit power for uplink CC-N 370 independently of the transmit powers of the other uplink CCs 360 through 365.

As a further example, continuing with the power allocations and calculations described above with respect to FIG. 3A, assume uplink CC1 and CC2 360, 365 are transmitted through a single PA 375, a current transmit power for uplink CC1 360 is 20 dBm, a current transmit power for uplink CC2 365 is 10 dBm, MPR is 0 dB, and A-MPR is also 0 dB. The calculations for the maximum transmit powers for each uplink CC 360, 365 may be performed as discussed above, in which proportionally equal amounts of power increases for each CC are taken into account. The calculations for the maximum transmit power for uplink CC-N 370 may be determined independently of the calculated maximum transmit powers of the uplink CCs 360 and 365. Such a configuration may be used in situations where the uplink CCs 360, 365 are intra-band, and CC-N in inter-band. A separate PA 380 may be used for transmitting CC-N 370, and the maximum transmit power for CC-N is calculated independently of any maximum power calculations of CCs transmitted through other PAs. For example, if current transmit power for CC-N is 18 dBm, with MPR and A-MPR being 0 dB, the maximum transmit power for CC-N is calculated to be 23 dBm, leaving a power headroom for CC-N of 5 dBm.

In other examples, both frequency band A and frequency band B of FIG. 4 may each have two or more CCs, in which case the maximum transmit power for the intra-band CCs in each frequency band are calculated by taking into account increases in transmit power of the other CCs in the same frequency band. Similarly, multiple CCs may each be inter-band CCs, and each transmitted through separate PAs, in which case the maximum transmit power for each CC may be calculated independently of the power for other of the concurrently transmitted CCs. User equipment 110-c may transmit an indication indicating whether a PHR is based on CCs transmitted through a single PA (and thus account for increases in power for other CCs transmitted through the PA). Alternatively, the eNB 105-c may assume that intra-band CCs are transmitted through a single PA, and thus that the PHR for the intra-band CCs account for increases in power for other CCs transmitted through the PA.

Figure 5:
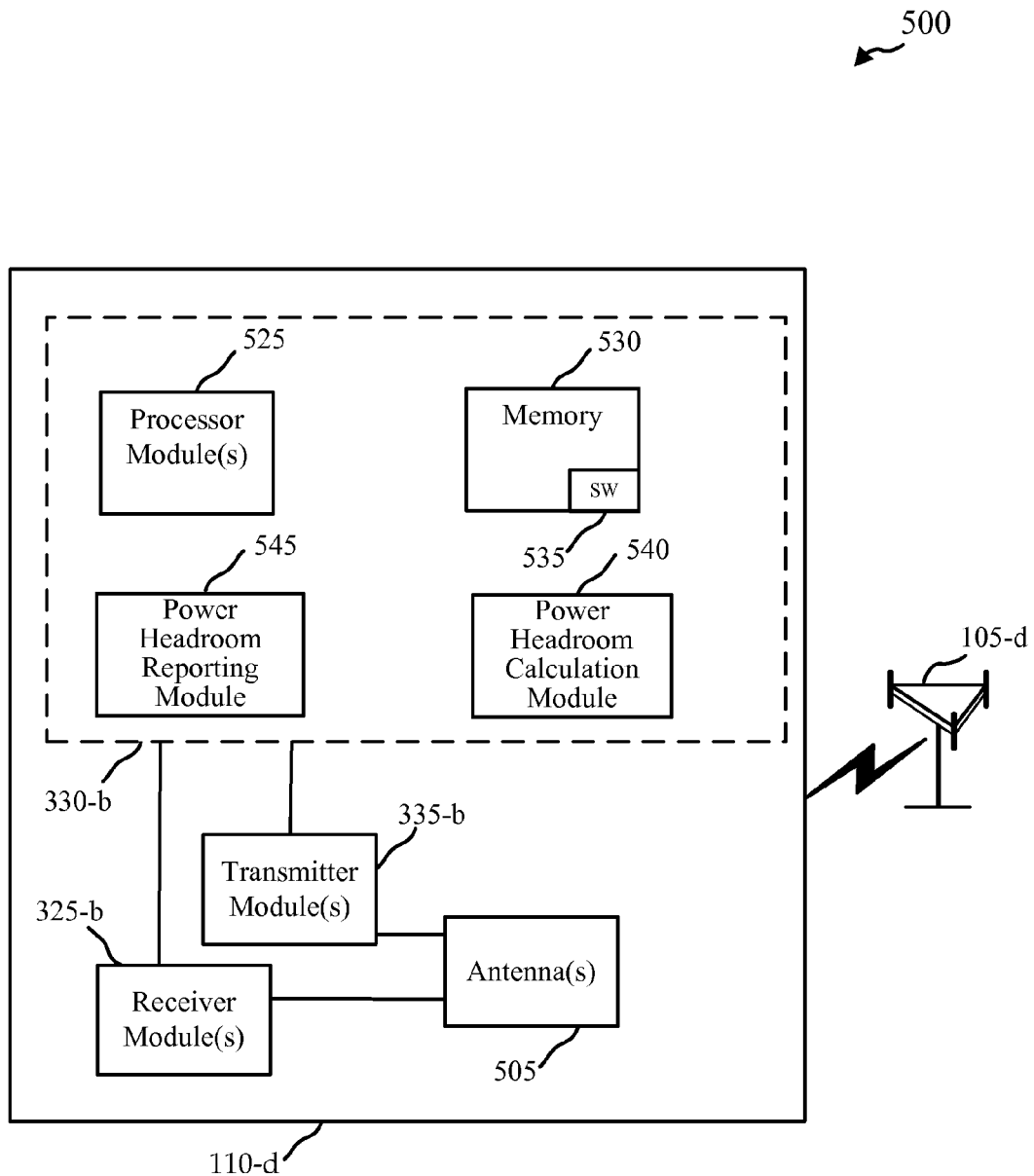
FIG. 5 is a block diagram of a user equipment that facilitates power headroom reporting for multiple CCs.

Referring now to FIG. 5 an example wireless communication system 500 that transmits PHRs for multiple component carriers is depicted. System 600 includes a base station 105-d and user equipment 110-d that can communicate with base station 105-d to receive access to a wireless network, similarly as described above. User equipment 110-d includes one or more antenna(s) 505 communicatively coupled with receiver module(s) 325-b and transmitter module(s) 335-b, which are in turn communicatively coupled with a control module 330-b. Control module 330-b includes one or more processor module(s) 525, a memory 530 that contains software 535 for execution by processor module 525, a power headroom calculation module 540, and a power headroom reporting module 545.

The processor module 525, power headroom calculation module 540, and/or power headroom reporting module 545 may include one or more intelligent hardware device, e.g., a central processing unit (CPU) such as those made by Intel® Corporation or AMD®, a microcontroller, an application specific integrated circuit (ASIC), etc. The memory 530 may include random access memory (RAM) and read-only memory (ROM). The memory 530 may store computer-readable, computer-executable software code 535 containing instructions that are configured to, when executed (or when compiled and executed), cause the processor module 525 to perform various functions described herein (e.g., maximum transmit power calculations, power headroom calculations, PHR generation, PHR transmission, etc.). The components of the control module 330-b may, individually or collectively, be implemented with one or more Application Specific Integrated Circuits (ASICs) adapted to perform some or all of the applicable functions in hardware.

The transmitter module(s) 335-b may transmit to base station 105-d (and/or other base stations) over one or more uplink CCs, as described above. Furthermore, transmitter module(s) 335-b may contain a number of power amplifiers. In some examples one power amplifier may be used to transmit multiple intra-band CCs, while inter-band CCs are transmitted in different power amplifiers. The receiver module(s) 325-b can receive downlink transmissions from base station 105-d (and/or other base stations) over two or more downlink CCs, as described above.

Downlink transmissions are received and processed at the user equipment 110-d. Power headroom calculation module 540 (which may be an example of power headroom calculation module 284 of FIG. 2) may provide calculations of maximum transmit power for each CC, as described above for power headroom calculation module 284. More specifically, power headroom calculation module 540 may identify a transmit power associated with each uplink CC and other configuration information of the user equipment 110-d, and calculate the power headroom available for each CC for the user equipment 110-d. As mentioned previously, according to various examples a user equipment 110-d may operate in a LTE Advanced (LTE-A) system according to Release 10 of the 3GPP specifications, and is allowed to set its $P_{CMAX}$, and $P_{CMAX,c}$ that each reflect certain adjustments such as limits imposed by upper layers ($P_{EMAX}$), MPR, and A-MPR values (requirements of higher order modulation, transmit bandwidth configuration, etc). In one example, a user equipment 110-d may set its configured maximum output power $P_{CMAX,c}$ on serving cell c as its total configured maximum output power $P_{CMAX}$. The maximum power is reached when the user equipment 110-d reaches allowed out-of-band emission limits or an adjacent channel leakage ratio (ACLR) limit.

According to various examples, the user equipment 110-d may have a maximum power output set at 23 dBm. Power headroom may be calculated for each CC based on a difference between a current transmit power for the CC and the maximum power output for the user equipment 110-d. In some examples, increases in transmit power of each CC may be taken into account by proportionally increasing transmit powers for each of the CCs (e.g., by increasing transmit powers by substantially equal amounts in dB). In some examples, the user equipment 110-d may be configured to transmit a set of uplink CCs, with a first CC and one or more other CCs forming a subset of component carriers. Increases in maximum transmit powers are calculated for each CC that take other CCs into account by proportionally increasing transmit powers for other CCs. Proportionally increasing transmit powers may include, for example, increasing transmit powers for each of the subset of CCs by substantially equal amounts as measured in dB. In some examples, the power headroom calculation module 540 calculates a maximum transmit power for each CC that depends upon a configuration of power amplifiers (PAs) used to transmit the different component carriers, similarly as described above. For example, a first CC and second CC may be configured with a current transmit power for the first CC of 20 dBm and a current transmit power for the second CC of 10 dBm. Further assume, for the present example, that MPR is 0 dB and A-MPR is also 0 dB. When determining $P_{CMAX}$ for the second CC, the power headroom calculation module 540, a proportionally equal amount of power increase in the first CC is taken into account. Because it was assumed MPR is 0 dB and A-MPR is 0 dB the power in the first CC could be increased by approximately 3 dB, namely the difference between $P_{CMAX,c}$ and the current transmit power for the first CC. In this example, the maximum transmit power for the second CC is calculated to be proportionally increased by the same amount (in dB) as the increase of the first CC, thus resulting in a calculated maximum transmit power of 13 dBm for the second CC. In another example, the power headroom calculation module 540 calculates maximum transmit powers for each CC that proportionally increase transmit powers for each CC by the same amount (in dB), and also factors in the maximum power allowed for the user equipment 110-d, and proportionally reduces the calculated maximum powers such that a sum of the powers does not exceed the allowed maximum power. Continuing with the above example, the power headroom calculation module 540 in such a case would calculate a maximum transmit power for the first as 22.6 dBm, and the maximum transmit power for the second CC 12.6 dBm, thus complying with the maximum total power of 23 dBm.

In another example, a user equipment 110-a may have a second subset of one or more CCs with a maximum transmit power for the one or more CCs in the first subset calculated independently of transmit powers of CC(s) in the second (or other) subset of CCs. In some examples, the first subset of CCs may include two or more intra-band CCs that are transmitted through a particular PA, and the second subset of CCs may include one or inter-band CCs are transmitted using a different PA. The power headroom calculation module 540 may calculate the maximum transmit power for CCs in the second subset independently of any maximum power calculations of CCs in the first subset. The power headroom calculation module 540 may be a means for performing one or more functions related to operation of the user equipment 105-d, such as a means for calculating a maximum transmit power and/or a means for identifying power headroom available for one or more CCs. Furthermore, the computer-executable software code 535 may contain instructions that are configured to, when executed (or when compiled and executed), cause the processor module 525 to perform various functions of the power headroom calculation module 540.

Power headroom reporting module 545 may receive calculated power headroom for one or more of the component carriers and generate a PHR that includes the power headroom information. In some examples, the power headroom reporting module 545 is configured to generate a first type of power headroom report (PHR) comprising the power headroom available for a first CC that takes into account increases in maximum transmit powers calculated for each CC that take other CCs into account by proportionally increasing transmit powers for other CCs. Proportionally increasing transmit powers may include, for example, increasing transmit powers for each CC by substantially equal amounts as measured in dB. The power headroom reporting module 545 may also generate a second type of power transmitted CCs. In some examples, the power headroom reporting module 545 generates the first type of PHR when two or more CCs are transmitted in a first frequency band (intra-band CCs), and generates the second type of PHR when two or more CCs are transmitted in different frequency bands (inter-band CCs). The power headroom reporting module 545 may in some examples provide a signal to indicate the PHR includes one or more of the first and/or second types of PHR. In other examples, a determination of a type of PHR is based on whether configured CCs include intra-band and/or inter-band CCs. The power headroom reporting module 545 may be a means for performing one or more functions related to operation of the user equipment 105-d, such as a means for generating a first and/or second type of PHR comprising power headroom available for one or more CCs. Furthermore, the computer-executable software code 535 may contain instructions that are configured to, when executed (or when compiled and executed), cause the processor module 525 to perform various functions of the power headroom reporting module 545.

Figure 6:
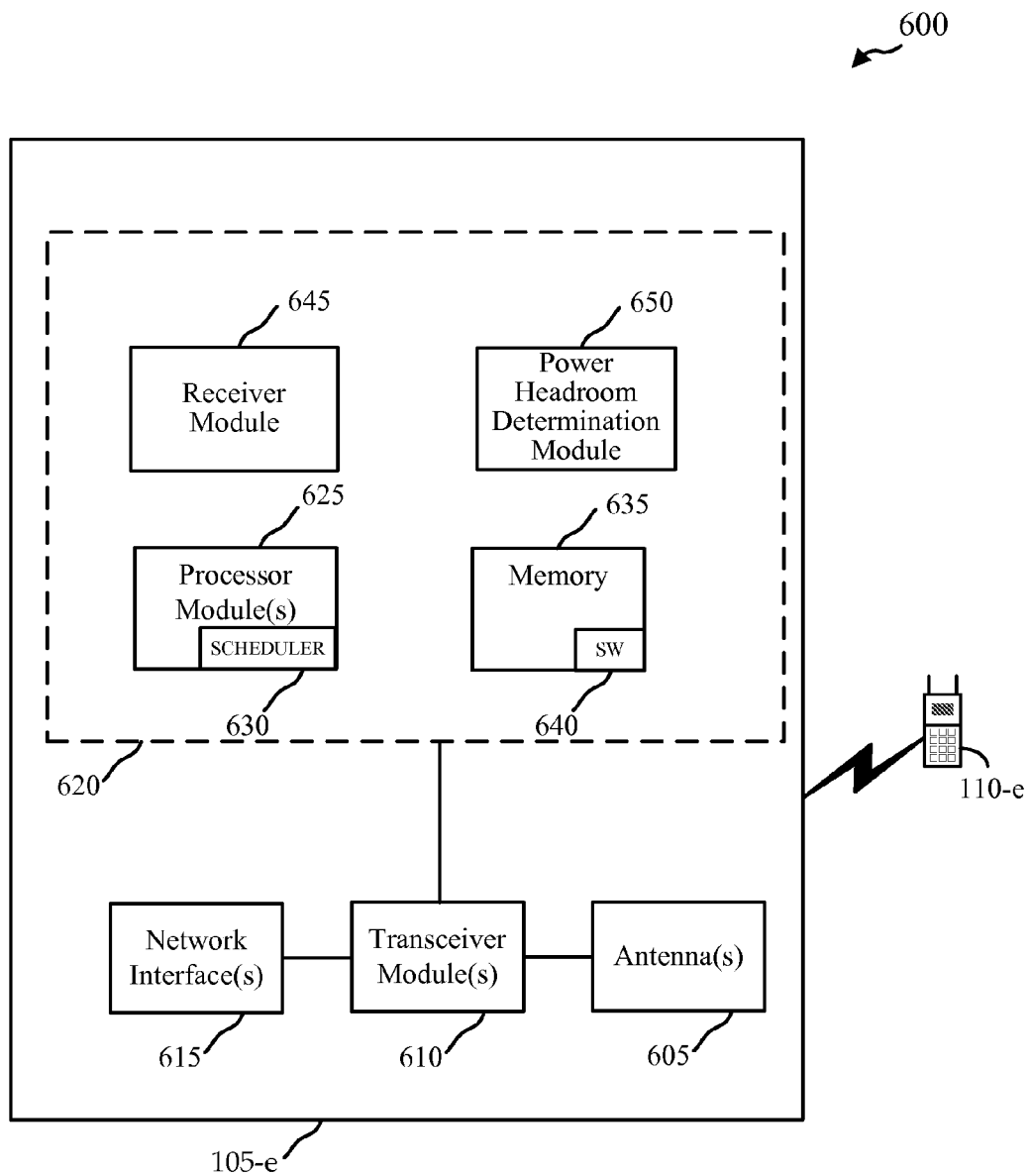
FIG. 6 is a block diagram of a base station that facilitates power headroom reporting for multiple CCs.

With reference now to FIG. 6, an example wireless communication system 600 that transmits PHRs for multiple component carriers is depicted. System 600 includes a base station 105-e and user equipment 110-e that may communicate with base station 105-e to receive access to a wireless network, as described. In addition, user equipment 110-e may receive communications over multiple downlink CCs, and transmit communications over multiple uplink CCs, with PHRs for the uplink CCs to be transmitted to the base station 105-e according to one or more of the various techniques described herein.

Base station 105-e includes one or more antennas 605 communicatively coupled with transceiver module(s) 610. Network interfaces 615 may provide an interface to one or more networks associated with the wireless communications system 600. Base station 105-e includes a control module 620 that contains one or more processor module(s) 625 that includes a scheduler 630, a memory 635 including software 640, a receiver module 645, and a power headroom determination module 650. The scheduler 630 may be included in the one or more processor module(s) 625, and may schedule the user equipment 110-e on a subset of configured carriers under the influence of processor module(s) 625. The memory 635 may include random access memory (RAM) and read-only memory (ROM). The memory 635 may store computer-readable, computer-executable software code 640 containing instructions that are configured to, when executed (or when compiled and executed), cause the processor module 625 to perform various functions described herein (e.g., receiving PHR communication, determining which of one or more types of PHR are included in the PHR communication, determining maximum CC transmit power, etc.). The components of the control module 620 may, individually or collectively, be implemented with one or more Application Specific Integrated Circuits (ASICs) adapted to perform some or all of the applicable functions in hardware. Each of the noted modules may be a means for performing one or more functions related to operation of the base station 105-d.

Receiver module 645 may a receive a power headroom report (PHR) communication that comprises one or more of a first type of PHR and a second type of PHR, as described above. For example, receiver module 645 may receive a first type of PHR in which power headroom for two or more CCs is based on a proportional increase in transmit power for two or more uplink component carriers to be concurrently transmitted through a single power amplifier. As described above, maximum transmit power for each CC may be calculated by taking into account an increase in transmit power across each CC that is substantially equal. The receiver module 645 may also receive a second type of PHR in which power headroom for one CC transmitted through a single power amplifier independently of other CCs that may be transmitted using other power amplifiers. Power headroom determination module 650 may determine which of the first type and/or second type of PHR are included in the PHR communication. The receiver module 645 may be a means for performing one or more functions related to operation of the base station 105-d, such as means for receiving a power headroom report (PHR) communication that comprises one or more of a first type of PHR and a second type of PHR, and/or means for determining which of the one or more of the first type and second type of PHR are included in the PHR communication, etc. Furthermore, the computer-executable software code 640 may contain instructions that are configured to, when executed (or when compiled and executed), cause the processor module 625 to perform various functions of the receiver module 645. In one example, the receiver module 645 also receives a signal that indicates which type(s) of PHR is(are) present, which is provided to the power headroom determination module 650. In another example, the power headroom determination module 650 determines which type of PHR is present by determining if the received CCs are intra-band or inter-band CCs. If two or more CCs are transmitted in the same frequency band (intra-band CCs), the power headroom determination module 650 determines that a PHR of the first type is present, and if any one CC is transmitted on a different frequency band from other CCs, the power headroom determination module 650 determines that a PHR of the second type is present. Power headroom determination module 650 may also determine maximum transmit power for one or more uplink component carriers that are to be transmitted, based on the received PHR communication and the one or more types of PHR included in the PHR communication. The power headroom determination module 650 may be a means for performing one or more functions related to operation of the base station 105-e, such as means for determining maximum transmit power for one or more to be concurrently transmitted uplink CCs. Furthermore, the computer-executable software code 640 may contain instructions that are configured to, when executed (or when compiled and executed), cause the processor module 625 to perform various functions of the power headroom determination module 650.

Figure 7:
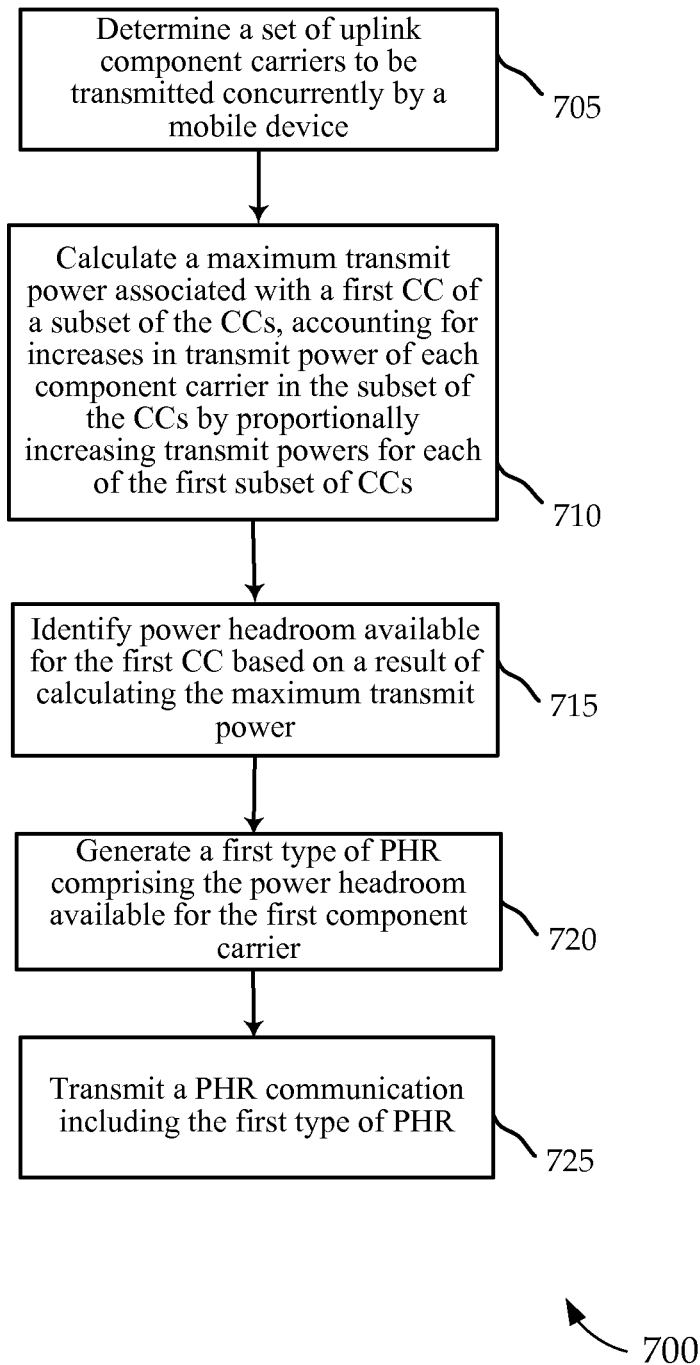
FIG. 7 is a flowchart of a method for determining and transmitting a power headroom report for multiple CCs.

FIG. 7 illustrates a method 700 that may be carried out by a user equipment to determine and transmit a PHR communication including power headroom available on a plurality of downlink component carriers. The method 700 may, for example, be performed by a user equipment of FIG. 1, 2, 3A, 3B, or 5, or using any combination of the devices described for these figures. Initially, at block 705, it is determined that a set of uplink component carriers are to be transmitted concurrently by a mobile device. A maximum transmit power associated with a first CC of a subset of the CCs is calculated at block 710, the calculation accounting for increases in transmit power of each component carrier in the subset of the CCs. This can include proportionally increasing transmit powers for each of the first subset of CCs. Proportionally increasing transmit powers may include, for example, increasing transmit powers for each of the first subset of component carriers by substantially equal amounts as measured in dB. In one example, as described above, CC1 and CC2 may be transmitted concurrently, with a current transmit power for CC1 of 20 dBm, and a current transmit power for CC2 of 10 dBm. Further, MPR and A-MPR may be 0 dB. When determining a maximum transmit power for CC2, a proportionally equal amount of power increase in CC1 is taken into account. Because MPR is 0 dB and A-MPR is 0 dB the power in CC1 is calculated to be increased by approximately 3 dB, namely the difference between a maximum transmit power and the current transmit power for CC1. In this example, the maximum transmit power for CC2 is calculated to be proportionally increased by the same amount (in dB) as the increase of CC1, thus resulting in a calculated maximum transmit power of 13 dBm for CC2. At block 715, power headroom available for the first CC is identified based on a result of calculating the maximum transmit power. For example, a power headroom may be calculated by subtracting the current transmit power from the calculated maximum transmit power for the CC. A first type of PHR is generated at block 720, the PHR comprising the power headroom available for the first component carrier. Finally, at block 725, a PHR communication is transmitted that includes the first type of PHR.

Figure 8:
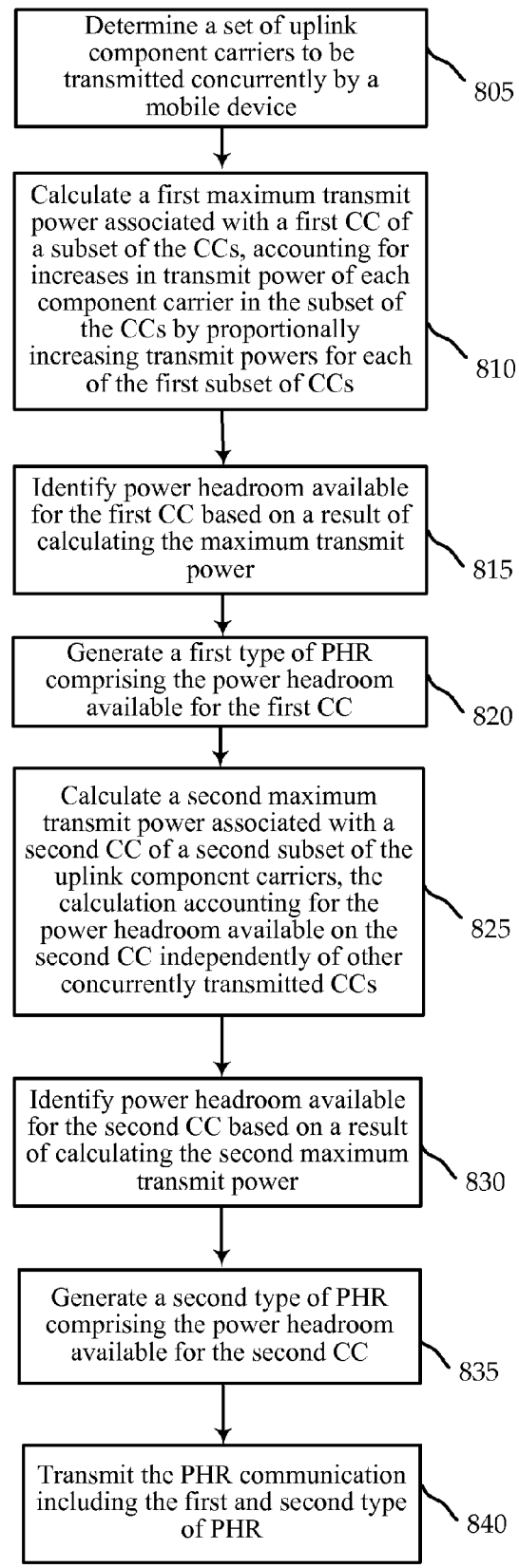
FIG. 8 is a flowchart of another method for determining and transmitting a power headroom report for multiple CCs.

Referring now to FIG. 8, another method 800 that may be carried out by a user to determine and transmit a PHR communication including power headroom available on a plurality of downlink component carriers. The method 800 may, for example, be performed by a user equipment of FIG. 1, 2, 3A, 3B, or 5, or using any combination of the devices described for these figures. Blocks 805 through 820 include the same steps as described with respect to blocks 702 through 720 of FIG. 7. The method 800 of FIG. 8 further includes calculating a second maximum transmit power associated with a second CC of a second subset of the uplink component carriers, the calculation accounting for the power headroom available on the second CC independently of other concurrently transmitted CCs, as noted at block 825. Power headroom available for the second CC is identified based on a result of calculating the second maximum transmit power, according to block 830. At lock 835, a second type of PHR is generated, the second type of PHR comprising the power headroom available for the second CC. Finally, at block 840, a PHR communication is transmitted that includes the first and the second type of PHR.

Figure 9:
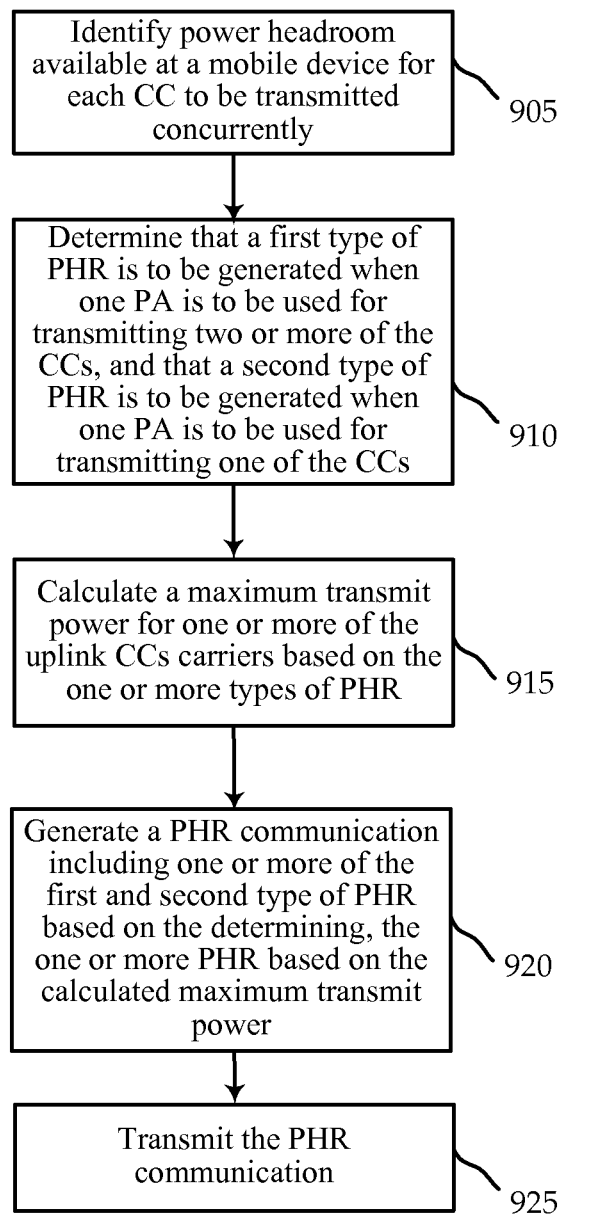
FIG. 9 is a flowchart of another method for determining and transmitting a power headroom report for multiple CCs.

Referring now to FIG. 9, a method 900 is provided that may be carried out by a user equipment to transmit PHR communications for multiple uplink CCs. The method 900 may, for example, be performed by a user equipment of FIG. 1, 2, 3A, 3B, or 5, or using any combination of the devices described for these figures. Initially, at block 905, power headroom available at a mobile device for each CC to be transmitted concurrently is identified. As noted earlier, such power headroom may be identified according to a maximum transmit power for a user equipment and a current transmit power for each respective CC. It is determined that a first type of PHR is to be generated when one power amplifier (PA) is to be used for transmitting two or more of the CCs, and that a second type of PHR is to be generated when one PA is to be used for transmitting one of the CCs, as indicated at block 910. A maximum transmit power for one or more of the uplink CCs carriers is calculated based on the one or more types of PHR, as noted at block 915. As described above, maximum transmit power may be calculated, for example, based on the number of CCs concurrently transmitted through a single PA, and taking into account proportional increases in transmit power of CCs transmitted through the PA. At block 920e a PHR communication is generated, the PHR communication including one or more of the first and second type of PHR based on the determining, the one or more PHR based on the calculated maximum transmit power. Finally, at block 925, the PHR communication is transmitted.

Figure 10:
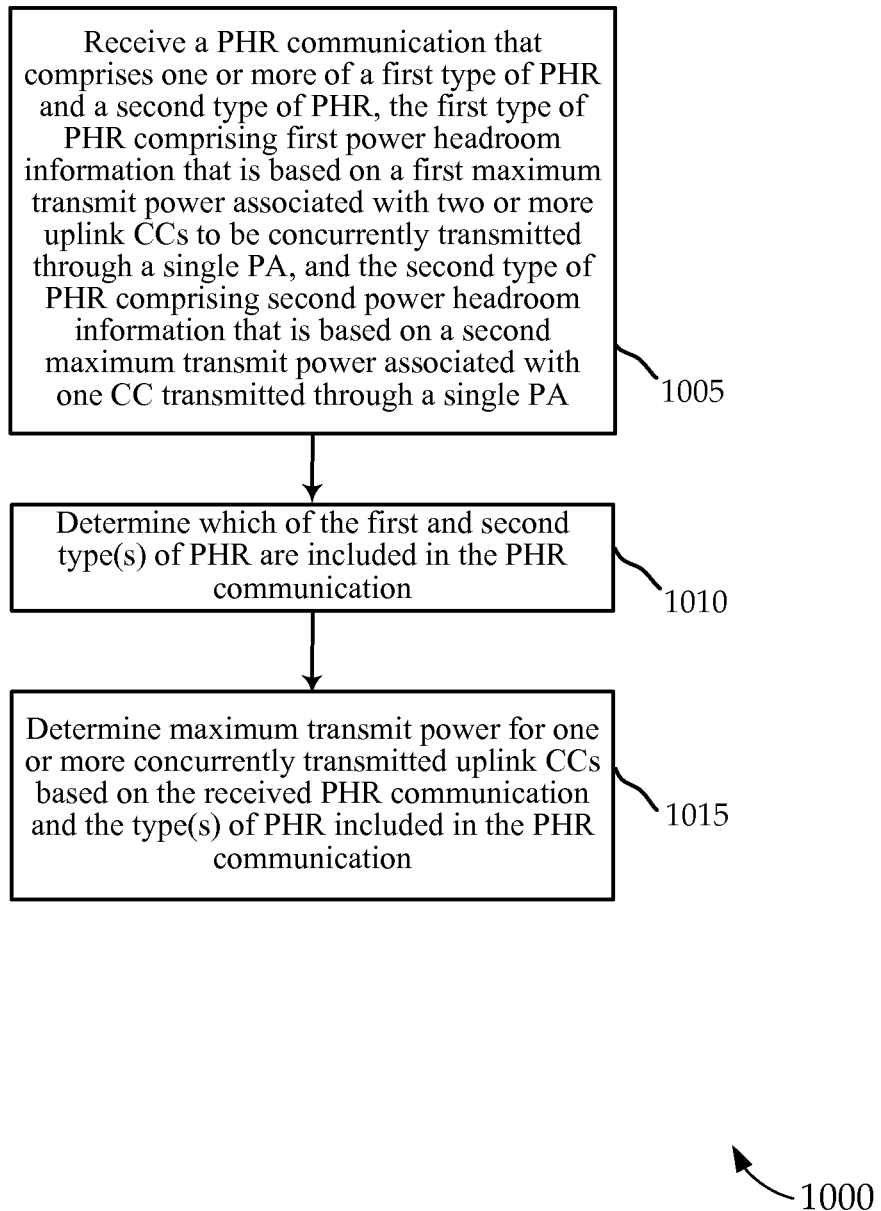
FIG. 10 is a flowchart of a method for wireless communication using a transmitted power headroom report for multiple CCs.

FIG. 10, illustrates a method 1000 that may be carried out by a base station to determine power headroom available at two or more concurrently transmitted CCs from a user equipment. The method 1000 may, for example, be performed by a base station of FIG. 1, 2, 3A, 3B, or 6, or using any combination of the devices described for these figures. Initially, at block 1005, a PHR communication is received that comprises one or more of a first type of PHR and a second type of PHR, the first type of PHR comprising first power headroom information that is based on a first maximum transmit power associated with two or more uplink CCs to be concurrently transmitted through a single PA, and the second type of PHR comprising second power headroom information that is based on a second maximum transmit power associated with one CC transmitted through a single PA. At block 1010, it is determined which of the first and second type(s) of PHR are included in the PHR communication. As discussed above, the determination may be made based on a communication from the user equipment, or may be made based on frequency bands of the associated CCs. A maximum transmit power is determined for one or more concurrently transmitted uplink CCs based on the received PHR communication and the type(s) of PHR included in the PHR communication, as indicated at block 1015.

Figure 11:
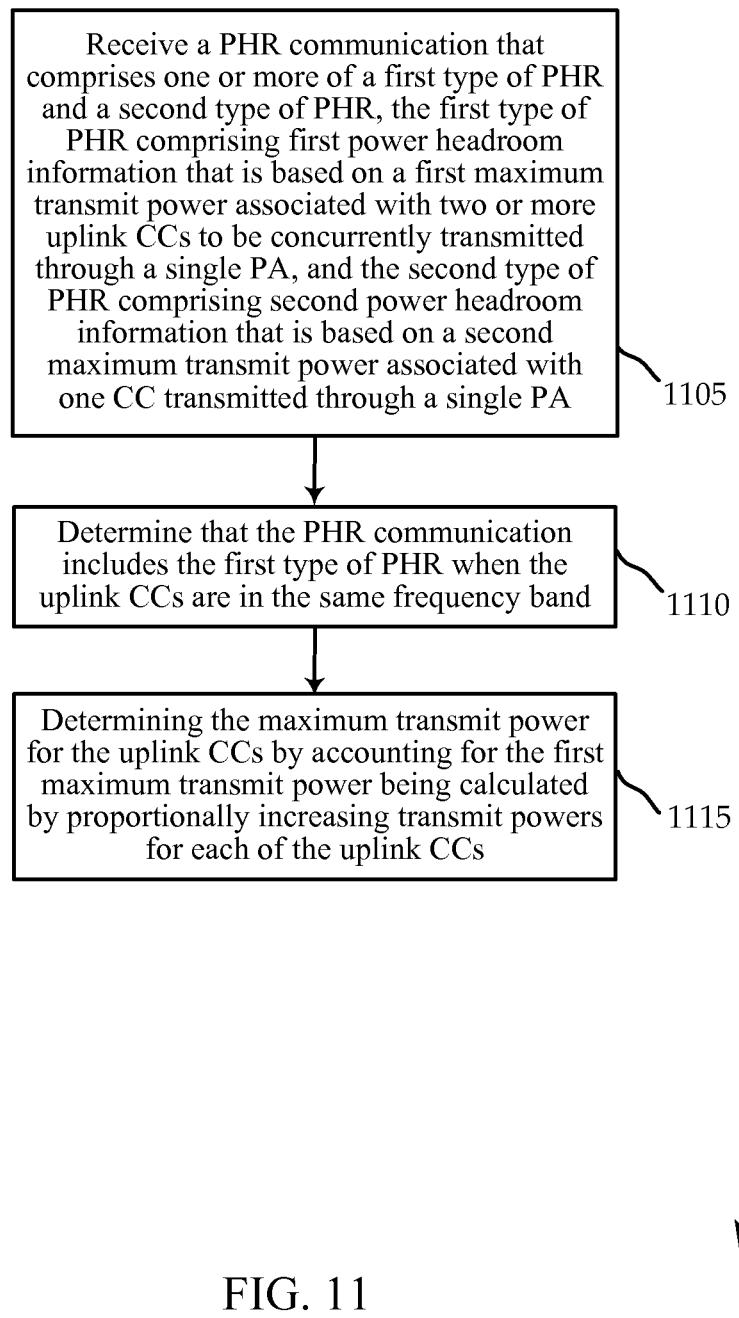
FIG. 11 is a flowchart of another method for wireless communication using a transmitted power headroom report for multiple CCs.

FIG. 11, illustrates another method 1100 that may be carried out by a base station to determine power headroom available at two or more concurrently transmitted CCs from a user equipment. The method 1100 may, for example, be performed by a base station of FIG. 1, 2, 3A, 3B, or 6, or using any combination of the devices described for these figures. Initially, at block 1105, a PHR communication is received that comprises one or more of a first type of PHR and a second type of PHR, the first type of PHR comprising first power headroom information that is based on a first maximum transmit power associated with two or more uplink CCs to be concurrently transmitted through a single PA, and the second type of PHR comprising second power headroom information that is based on a second maximum transmit power associated with one CC transmitted through a single PA. At block 1110, it is determined that the PHR communication includes the first type of PHR when the uplink CCs are in the same frequency band. As discussed above, when two or more CCs are transmitted in the same frequency band, a single power amplifier may be used to concurrently transmit the CCs. A maximum transmit power is determined for the uplink CCs by accounting for the first maximum transmit power being calculated by proportionally increasing transmit powers for each of the uplink CCs, as indicated at block 1115. Proportionally increasing transmit powers may include, for example, increasing transmit powers for each of the uplink CCs by substantially equal amounts as measured in dB.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1X EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of" A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication in a multicarrier system, comprising:
   determining a set of uplink component carriers to be transmitted concurrently by a mobile device;
   calculating a maximum transmit power associated with a first uplink component carrier in the set, the calculation accounting for increases in transmit power of each uplink component carrier in at least a first subset of the uplink component carriers that includes the first uplink component carrier by proportionally increasing transmit powers for each of the first subset of uplink component carriers;
   identifying power headroom available for the first uplink component carrier based on a result of calculating the maximum transmit power;
   generating a first type of power headroom report (PHR) comprising the power headroom available for the first uplink component carrier; and
   transmitting a PHR communication including the first type of PHR.

2. The method of claim 1, wherein proportionally increasing transmit powers comprises increasing transmit powers for each of the first subset of uplink component carriers by substantially equal amounts as measured in dB.

3. The method of claim 1, wherein each of the first subset of uplink component carriers are to be transmitted concurrently with support from a same power amplifier.

4. The method of claim 1, further comprising:
   calculating a second maximum transmit power associated with a second uplink component carrier of a second subset of the uplink component carriers, the calculation accounting for the power headroom available on the second uplink component carrier independently of other concurrently transmitted uplink component carriers;
   identifying power headroom available for the second uplink component carrier based on a result of calculating the second maximum transmit power;
   generating a second type of power headroom report (PHR) comprising the power headroom available for the second uplink component carrier; and
   transmitting the PHR communication including the second type of PHR.

5. The method of claim 4, further comprising:
   transmitting a signal to indicate which of the first type and second type of PHR is included in the PHR communication.

6. The method of claim 4, wherein each of the first subset of uplink component carriers are transmitted in a first frequency band, and the second uplink component carrier is transmitted in a second frequency band that is different than the first frequency band.

7. The method of claim 6, wherein a power amplifier that supports transmission of each uplink component carrier is determined based on the frequency band of the uplink component carrier.

8. The method of claim 4, wherein the second subset of uplink component carriers includes a single uplink component carrier, and the first subset of uplink component carriers includes two uplink component carriers.

9. The method of claim 8, wherein first subset of uplink component carriers includes the first uplink component carrier and a third uplink component carrier, and the PHR communication includes available power headroom corresponding to the third uplink component carrier that is based on the calculated maximum transmit power for the first uplink component carrier.

10. The method of claim 1, further comprising:
    transmitting a signal to indicate the PHR communication is based on calculated maximum transmit power for only the first uplink component carrier.

11. The method of claim 1, wherein the first type of PHR is based on the calculated maximum transmit power for each uplink component carrier.

12. The method of claim 1, wherein each of the first subset of uplink component carriers are transmitted concurrently with support from a first power amplifier, and at least a second uplink component carrier is transmitted concurrently from the mobile device with support from a second power amplifier.

13. The method of claim 12, further comprising:
    calculating a second maximum transmit power associated with the second uplink component carrier, the calculation accounting for the power headroom available on the second uplink component carrier independently of other uplink component carriers; and
    generating a second type of PHR based on the second calculated maximum transmit power, and wherein transmitting the PHR communication comprises transmitting the second type of PHR.

14. The method of claim 13, wherein the first subset of uplink component carriers includes the first uplink component carrier and a third uplink component carrier, and the maximum transmit power for the third uplink component carrier is determined based on the calculated maximum transmit power for the first uplink component carrier.

15. The method of claim 14, further comprising:
    transmitting a signal to indicate the first type of PHR is based on the calculated maximum transmit power for only the first uplink component carrier and that the second type of PHR is based on the second calculated maximum transmit power.

16. The method of claim 13, wherein the first type of PHR is based on the calculated maximum transmit power for each uplink component carrier of the first subset, and the second type of PHR is based on the second calculated maximum transmit power.

17. An apparatus for reporting power headroom in a multi uplink component carrier wireless communication system, comprising:
    a power headroom calculation module configured to:
        calculate a maximum transmit power associated with a first uplink component carrier in a set of concurrently transmitted uplink component carriers, the calculation accounting for increases in transmit power of each uplink component carrier in at least a first subset of the uplink component carriers that includes the first uplink component carrier by proportionally increasing transmit powers for each of the first subset of uplink component carriers; and identify a power headroom available for the first uplink component carrier based on the calculated the maximum transmit power;

a power headroom reporting module configured to generate a first type of power headroom report (PHR) comprising the power headroom available for the first uplink component carrier; and a transmitter module configured to transmit a PHR communication including the first type of PHR.

18. The apparatus of claim 17, wherein proportionally increasing transmit powers comprises increasing transmit powers for each of the first subset of uplink component carriers by substantially equal amounts as measured in dB.

19. The apparatus of claim 17, wherein the transmitter module comprises two or more power amplifiers, and each of the first subset of uplink component carriers are to be transmitted concurrently with support from a same power amplifier.

20. The apparatus of claim 17, wherein:
the power headroom calculation module is further configured to:
calculate a second maximum transmit power associated with a second uplink component carrier of a second subset of the uplink component carriers, the calculation accounting for the power headroom available on the second uplink component carrier independently of other concurrently transmitted uplink component carriers; and
identify power headroom available for the second uplink component carrier based on a result of calculating the second maximum transmit power;
the power headroom reporting module is further configured to generate a second type of power headroom report (PHR) comprising the power headroom available for the second uplink component carrier; and
the transmitter module is further configured to transmit the PHR communication including the second type of PHR.

21. The apparatus of claim 20, wherein each of the first subset of uplink component carriers are transmitted in a first frequency band, and the second uplink component carrier is transmitted in a second frequency band that is different than the first frequency band.

22. The apparatus of claim 21, wherein a power amplifier that supports transmission of each uplink component carrier is determined based on the frequency band of the uplink component carrier.

23. The apparatus of claim 20, wherein the second subset of uplink component carriers includes a single uplink component carrier, and the first subset of uplink component carriers includes two uplink component carriers.

24. The apparatus of claim 17, wherein the transmitter module is further configured to transmit a signal to indicate the PHR communication is based on calculated maximum transmit power for only the first uplink component carrier.

25. A computer program product for reporting power headroom from a mobile device, the computer program product comprising:
a non-transitory computer-readable medium comprising:
code for determining a set of uplink component carriers to be transmitted concurrently by a mobile device;
code for calculating a maximum transmit power associated with a first uplink component carrier in the set, the calculation accounting for increases in transmit power of each uplink component carrier in at least a first subset of the uplink component carriers that includes the first uplink component carrier by proportionally increasing transmit powers for each of the first subset of uplink component;

code for identifying power headroom available for the first uplink component carrier based on a result of calculating the maximum transmit power;

code for generating a first type of power headroom report (PHR) comprising the power headroom available for the first uplink component carrier; and code for transmitting a PHR communication including the first type of PHR.

26. The computer program product of claim 25 wherein proportionally increasing transmit powers comprises increasing transmit powers for each of the first subset of uplink component carriers by substantially equal amounts as measured in dB.

27. The computer program product of claim 25, wherein the non-transitory computer-readable medium further comprises:
code for calculating a second maximum transmit power associated with a second uplink component carrier of a second subset of the uplink component carriers, the calculation accounting for the power headroom available on the second uplink component carrier independently of other concurrently transmitted uplink component carriers;
code for identifying power headroom available for the uplink second component carrier based on a result of calculating the second maximum transmit power;
code for generating a second type of power headroom report (PHR) comprising the power headroom available for the second uplink component carrier; and
code for transmitting the PHR communication including the second type of PHR.

28. The computer program product of claim 27, wherein the non-transitory computer-readable medium further comprises:
code for transmitting a signal to indicate which of the first type and second type of PHR is included in the PHR communication.

29. The computer program product of claim 27, wherein each of the first subset of uplink component carriers are transmitted in a first frequency band, and the second uplink component carrier is transmitted in a second frequency band that is different than the first frequency band.

30. The computer program product of claim 25, wherein the non-transitory computer-readable medium further comprises:
code for transmitting a signal to indicate the PHR communication is based on calculated maximum transmit power for only the first uplink component carrier.

31. A system for reporting power headroom in a multicarrier wireless communication system, comprising:
means for determining a set of uplink component carriers to be transmitted concurrently by a mobile device;
means for calculating a maximum transmit power associated with a uplink first component carrier in the set, the calculation accounting for increases in transmit power of each uplink component carrier in at least a first subset of the uplink component carriers that includes the first uplink component carrier by proportionally increasing transmit powers for each of the first subset of uplink component carriers;
means for identifying power headroom available for the first uplink component carrier based on a result of calculating the maximum transmit power;

means for generating a first type of power headroom report (PHR) comprising the power headroom available for the first uplink component carrier; and means for transmitting a PHR communication including the first type of PHR.

32. The system of claim 31, wherein proportionally increasing transmit powers comprises increasing transmit powers for each of the first subset of uplink component carriers by substantially equal amounts as measured in dB.

33. The system of claim 31, further comprising:
means for calculating a second maximum transmit power associated with a second uplink component carrier of a second subset of the uplink component carriers, the calculation accounting for the power headroom available on the second uplink component carrier independently of other concurrently transmitted uplink component carriers;

means for identifying power headroom available for the second uplink component carrier based on a result of calculating the second maximum transmit power;

means for generating a second type of power headroom report (PHR) comprising the power headroom available for the second uplink component carrier; and means for transmitting the PHR communication including the second type of PHR.

34. The system of claim 33, further comprising:
means for transmitting a signal to indicate which of the first type and second type of PHR is included in the PHR communication.

35. The system of claim 33, wherein each of the first subset of uplink component carriers are transmitted in a first frequency band, and the second uplink component carrier is transmitted in a second frequency band that is different than the first frequency band.

36. The system of claim 35, wherein a power amplifier that supports transmission of each uplink component carrier is determined based on the frequency band of the uplink component carrier.

37. The system of claim 31, further comprising:
means for transmitting a signal to indicate the PHR communication is based on calculated maximum transmit power for only the first uplink component carrier.

38. A method of wireless communication in a multicarrier system, comprising:
identifying power headroom available at a mobile device for each of a plurality of uplink component carriers to be transmitted concurrently from the mobile device;

determining that a first type of power headroom report (PHR) is to be generated when one power amplifier is to be used for supporting transmission of two or more of the uplink component carriers, and that a second type of PHR is to be generated when one power amplifier is to be used for supporting transmission of one of the uplink component carriers;

calculating a maximum transmit power for one or more of the uplink component carriers based on the one or more types of PHR;

generating a PHR communication including one or more of the first and second type of PHR based on the determining, the one or more PHR based on the calculated maximum transmit power; and transmitting the PHR communication.

39. The method of claim 38, wherein calculating a maximum transmit power comprises:
calculating, when it is determined that the first type of PHR is to be generated, a maximum transmit power associated with at least one of the two or more uplink component carriers, the calculation accounting for the power headroom available at each of the two or more uplink component carriers by proportionally increasing transmit powers for each uplink component carrier by a substantially equal amount.

40. The method of claim 38, wherein calculating a maximum transmit power comprises:
calculating, when it is determined that the second type of PHR is to be generated, a maximum transmit power associated with the one uplink component carrier, the calculation accounting for the power headroom available at the one uplink component carrier independently of any increase in transmit power of other of the uplink component carriers.

41. The method of claim 38, further comprising:
transmitting a signal to indicate which of the first type and second type of PHR is transmitted.

42. The method of claim 38, wherein each of the two or more uplink component carriers are transmitted in a first frequency band, and the one uplink component carrier is transmitted in a second frequency band that is different than the first frequency band.

43. The method of claim 42, wherein the power amplifier that supports transmission of each uplink component carrier is determined based on the frequency band of the uplink component carrier.

44. The method of claim 42, wherein the first type of PHR includes power headroom information for one of the two or more uplink component carriers based on the calculated maximum transmit power for another of the two or more uplink component carriers.

45. The method of claim 38, further comprising:
transmitting a signal to indicate the first type of PHR is based on calculated maximum transmit power for only one of the two or more uplink component carriers when the first maximum transmit power is calculated.

46. A computer program product for reporting power headroom from a mobile device, the computer program product comprising:
a non-transitory computer-readable medium comprising:
code for identifying power headroom available at a mobile device for each of a plurality of uplink component carriers to be transmitted concurrently from the mobile device;

code for determining that a first type of power headroom report (PHR) is to be generated when one power amplifier is to be used for supporting transmission of two or more of the uplink component carriers, and that a second type of PHR is to be generated when one power amplifier is to be used for supporting transmission of one of the uplink component carriers;

code for calculating a maximum transmit power for one or more of the uplink component carriers based on the one or more types of PHR;

code for generating a PHR communication including one or more of the first and second type of PHR based on the determining, the one or more PHR based on the calculated maximum transmit power; and code for transmitting the PHR communication.

47. The computer program product of claim 46, wherein the code for calculating a maximum transmit power comprises:
code for calculating, when it is determined that the first type of PHR is to be generated, a maximum transmit power associated with at least one of the two or more uplink component carriers, the calculation accounting for the power headroom available at each of the two or more uplink component carriers by proportionally increasing transmit powers for each uplink component carrier by a substantially equal amount.

48. The computer program product of claim 46, wherein the code for calculating a maximum transmit power comprises:
code for calculating, when it is determined that the second type of PHR is to be generated, a maximum transmit power associated with the one uplink component carrier, the calculation accounting for the power headroom available at the one uplink component carrier independently of any increase in transmit power of other of the uplink component carriers.

49. A multicarrier wireless communication system, comprising:
means for identifying power headroom available at a mobile device for each of a plurality of uplink component carriers to be transmitted concurrently from the mobile device;
means for determining that a first type of power headroom report (PHR) is to be generated when one power amplifier is to be used for supporting transmission of two or more of the uplink component carriers, and that a second type of PHR is to be generated when one power amplifier is to be used for supporting transmission of one of the uplink component carriers;
means for calculating a maximum transmit power for one or more of the uplink component carriers based on the one or more types of PHR;
means for generating a PHR communication including one or more of the first and second type of PHR based on the determining, the one or more PHR based on the calculated maximum transmit power; and
means for transmitting the PHR communication.

50. The system of claim 49, wherein the means for calculating a maximum transmit power comprises:
means for calculating, when it is determined that the first type of PHR is to be generated, a maximum transmit power associated with at least one of the two or more uplink component carriers, the calculation accounting for the power headroom available at each of the two or more uplink component carriers by proportionally increasing transmit powers for each uplink component carrier by a substantially equal amount.

51. The system of claim 49, wherein the means for calculating a maximum transmit power comprises:
means for calculating, when it is determined that the second type of PHR is to be generated, a maximum transmit power associated with the one uplink component carrier, the calculation accounting for the power headroom available at the one uplink component carrier independently of any increase in transmit power of other of the uplink component carriers.

52. The system of claim 49, further comprising:
means for transmitting a signal to indicate which of the first type and second type of PHR is transmitted.

53. The system of claim 49, wherein each of the two or more uplink component carriers are transmitted in a first frequency band, and the one uplink component carrier is transmitted in a second frequency band that is different than the first frequency band.

54. The system of claim 49, wherein the power amplifier that supports transmission of each uplink component carrier is determined based on the frequency band of the uplink component carrier.

55. The system of claim 49, further comprising:
means for transmitting a signal to indicate the first type of PHR is based on calculated maximum transmit power for only one of the two or more uplink component carriers when the first maximum transmit power is calculated.

56. A wireless communication apparatus, comprising:
a receiver module configured to receive a power headroom report (PHR) communication that comprises one or more of a first type of PHR and a second type of PHR, the first type of PHR comprising first power headroom information that is based on a first maximum transmit power associated with two or more uplink component carriers to be concurrently transmitted through a single power amplifier, and the second type of PHR comprising second power headroom information that is based on a second maximum transmit power associated with a selected one uplink component carrier transmitted through a single power amplifier; and
a power headroom determination module configured to determine which of the one or more of the first type and second type of PHR are included in the PHR communication, and to determine maximum transmit power for one or more to be concurrently transmitted uplink component carriers based on the PHR communication and the one or more types of PHR included in the PHR communication.

57. The apparatus of claim 56, wherein the power headroom determination module is further configured to determine that the PHR communication includes the first type of PHR when the two or more uplink component carriers are in the same frequency band.

58. The apparatus of claim 57, wherein the power headroom determination module is further configured to determine the maximum transmit power for the two or more uplink component carriers by accounting for the first maximum transmit power being calculated by proportionally increasing transmit powers for each of the plurality of uplink component carriers.

59. The apparatus of claim 56, wherein the power headroom determination module is further configured to determine that the PHR communication includes the second type of PHR when the selected one uplink component carrier is in a frequency band that is different than the frequency band of other of the plurality of uplink component carriers.

60. The apparatus of claim 59, wherein the power headroom determination module is further configured to determine the maximum transmit power for the selected one uplink component carrier by accounting for the second maximum transmit power being calculated independently of any increase in transmit power of other of the uplink component carriers.

61. The apparatus of claim 57, wherein the first power headroom information is based on a maximum transmit power for a first of the two or more uplink carriers, and the power headroom determination module is further configured to determine the maximum transmit power for a second of the two or more uplink component carriers based on a difference between a current transmit power of the first of the two or more uplink carriers and the first power headroom information.

62. The apparatus of claim 57, wherein the receiver module configured to receive a plurality of concurrently transmitted uplink component carriers.

63. A method for wireless communication in a multi carrier wireless communication system, comprising:
- receiving a power headroom report (PHR) communication that comprises one or more of a first type of PHR and a second type of PHR, the first type of PHR comprising first power headroom information that is based on a first maximum transmit power associated with two or more uplink component carriers to be concurrently transmitted through a single power amplifier, and the second type of PHR comprising second power headroom information that is based on a second maximum transmit power associated with a selected one uplink component carrier transmitted through a single power amplifier;
- determining which of the one or more of the first type and second type of PHR are included in the PHR communication; and
- determining maximum transmit power for one or more to be concurrently transmitted uplink component carriers based on the PHR communication and the one or more types of PHR included in the PHR communication.

64. The method of claim 63, further comprising:
- determining that the PHR communication includes the first type of PHR when the two or more uplink component carriers are in the same frequency band.

65. The method of claim 64, further comprising:
- determining the maximum transmit power for the two or more uplink component carriers by accounting for the first maximum transmit power being calculated by proportionally increasing transmit powers for each of the plurality of uplink component carriers.

66. The method of claim 63, further comprising:
- determining that the PHR communication includes the second type of PHR when the selected one uplink component carrier is in a frequency band that is different than the frequency band of other of the plurality of uplink component carriers.

67. The method of claim 64, wherein the first power headroom information is based on a maximum transmit power for a first of the two or more uplink carriers, and wherein determining the maximum transmit power comprises determining the maximum transmit power for a second of the two or more uplink component carriers based on a difference between a current transmit power of the first of the two or more uplink carriers and the first power headroom information.

68. A system for wireless communication in a multi carrier wireless communication system, comprising:
- means for receiving a power headroom report (PHR) communication that comprises one or more of a first type of PHR and a second type of PHR, the first type of PHR comprising first power headroom information that is based on a first maximum transmit power associated with two or more uplink component carriers to be concurrently transmitted through a single power amplifier, and the second type of PHR comprising second power headroom information that is based on a second maximum transmit power associated with a selected one uplink component carrier transmitted through a single power amplifier;
- means for determining which of the one or more of the first type and second type of PHR are included in the PHR communication; and
- means for determining maximum transmit power for one or more to be concurrently transmitted uplink component carriers based on the PHR communication and the one or more types of PHR included in the PHR communication.

69. The system of claim 68, wherein the means for determining maximum transmit power comprises:
- means for determining the maximum transmit power for the two or more uplink component carriers by accounting for the first maximum transmit power being calculated by proportionally increasing transmit powers for each of the plurality of uplink component carriers.

70. The system of claim 68, wherein the means for determining which of the one or more of the first type and second type of PHR are included in the PHR communication comprises:
- means for determining that the PHR communication includes the second type of PHR when the selected one uplink component carrier is in a frequency band that is different than the frequency band of other of the plurality of uplink component carriers.

71. The computer program product for determining transmit power a multi carrier wireless communication system, comprising:
- a non-transitory computer-readable medium comprising:
  - code for receiving a power headroom report (PHR) communication that comprises one or more of a first type of PHR and a second type of PHR, the first type of PHR comprising first power headroom information that is based on a first maximum transmit power associated with two or more uplink component carriers to be concurrently transmitted through a single power amplifier, and the second type of PHR comprising second power headroom information that is based on a second maximum transmit power associated with a selected one uplink component carrier transmitted through a single power amplifier;
  - code for determining which of the one or more of the first type and second type of PHR are included in the PHR communication; and
  - code for determining maximum transmit power for one or more to be concurrently transmitted uplink component carriers based on the PHR communication and the one or more types of PHR included in the PHR communication.

72. The computer program product of claim 71, wherein the non-transitory computer-readable medium further comprises:
- code for determining that the PHR communication includes the first type of PHR when the two or more uplink component carriers are in the same frequency band, and determining that the PHR communication includes the second type of PHR when the selected one uplink component carrier is in a frequency band that is different than the frequency band of other of the plurality of uplink component carriers.

73. The computer program product of claim 71, wherein the non-transitory computer-readable medium further comprises:
- code for determining the maximum transmit power for the two or more uplink component carriers by accounting for the first maximum transmit power being calculated by proportionally increasing transmit powers for each of the plurality of uplink component carriers.

* * * * *